US012691382B2

(12) United States Patent
Takubo et al.

(10) Patent No.: US 12,691,382 B2
(45) Date of Patent: Jul. 28, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Gen Takubo, Tokyo (JP); Shinichi Miura, Tokyo (JP); Yuya Kato, Tokyo (JP); Shuya Kanamaru, Tokyo (JP); Seishi Kawasaki, Tokyo (JP); Yasushi Okita, Tokyo (JP); Yusuke Kashiro, Tokyo (JP); Naoki Nishikawa, Tokyo (JP); Atsushi Yamazaki, Tokyo (JP)

(73) Assignee: CYGAMES, INC., Tokyo (JP)

( * ) Notice: Subject to any disclaimer, the term of this patent is extended or adjusted under 35 U.S.C. 154(b) by 234 days.

(21) Appl. No.: 18/436,665

(22) Filed: Feb. 8, 2024

(65) Prior Publication Data

US 2024/0181353 A1 Jun. 6, 2024

Related U.S. Application Data

(63) Continuation of application No. PCT/JP2022/030755, filed on Aug. 12, 2022.

(30) Foreign Application Priority Data

Aug. 13, 2021 (JP) ................................. 2021-131958

(51) Int. Cl.
A63F 13/69 (2014.01)
A63F 13/58 (2014.01)
A63F 13/533 (2014.01)

(52) U.S. Cl.
CPC .............. A63F 13/69 (2014.09); A63F 13/58 (2014.09); A63F 13/533 (2014.09)

(58) Field of Classification Search
CPC ......... A63F 13/69; A63F 13/58; A63F 13/533
See application file for complete search history.

(56) References Cited

FOREIGN PATENT DOCUMENTS

JP 2019171161 A 10/2019
JP 2021-090699 A 6/2021

OTHER PUBLICATIONS

Final Fantasy 7 Remake—The Arsenal Boss Fight https://www.youtube.com/watch?v=9MBDe9KgiZM Uploaded by Boss Fight Database Updated on Apr. 9, 2020 (Year: 2020).*

(Continued)

*Primary Examiner* — Jeffrey K Wong
(74) *Attorney, Agent, or Firm* — Osha Bergman Watanabe & Burton LLP

(57) ABSTRACT

A non-transitory computer readable medium stores a program causing a computer to execute: a process for allowing a selection of any of opponents including an opponent provided with a first condition and an opponent provided with a second condition; a process for executing a battle game against an opponent selected by a player; a process for, when the first condition is satisfied in the battle game, granting a first favorable condition favorable to the player in the battle game against the opponent for whom the first condition has been satisfied; and a process for, when the second condition is satisfied in the battle game, granting a second favorable condition favorable to the player in the battle game against an opponent other than the opponent for whom the second condition has been satisfied, wherein the first favorable condition and the second favorable condition can be granted simultaneously to one opponent.

6 Claims, 17 Drawing Sheets

(56)          References Cited

OTHER PUBLICATIONS

[Gundam EXVS. Maxiboost ON] Area G Strategy! Maxiboost Mission, YouTube, Aug. 22, 2020 [retrieved on May 20, 2025], https://www.youtube.com/watch?v=kQdGEvq7JPU (4 pages).

An in-depth look at "Maxiboost Mission" of "Mobile Suit Gundam Extreme VS. Maxiboost ON"! [Special Feature #4], PlayStation. Blog, Aug. 6, 2020 [retrieved on May 20, 2025], https://blog.ja.playstation.com/2020/08/06/20200806-exvsmbon/ (34 pages).

[Ryza's Atelier 2] Summary of Irreversible Elements [Ryza 2], GameWith, Dec. 25, 2020 [retrieved on May 20, 2025], https://gamewith.jp/atelierryza2/ article/show/243909 (13 pages).

[Kingdom Hearts 3] Irreversible Elements [KH3], GameWith, Jan. 9, 2020 [retrieved on May 20, 2025], https://gamewith.jp/kingdomhearts3/article/show/140759 (15 pages).

International Search Report issued in PCT/JP2022/030755 on Oct. 18, 2022 (3 pages).

Written Opinion of the International Searching Authority issued in PCT/JP2022/030755 on Oct. 18, 2022 (4 pages).

[Roma Saga RS] Capture at the End of a Distant Battle 2.5th Anniversary [Roma Saga Reuniverse] Saga/Conquest (Defeating the alter ego weakens the main body). Roma Saga RS Cheats wiki, [online] Jun. 29, 2021, https://gamewith.jp/sagareuniverse/article/show/285566, [retrieved on Feb. 18, 2022] (18 pages).

"Ortros" appears in the raid boss! Raid event held!, Square Enix Bridge [online], Jul. 20, 2016, https://cache.sqex-bridge.jp/guest/information/19662, [retrieved on Feb. 18, 2022] (5 pages).

Monster hunter 3 (tri) the master guide first edition, Sep. 30, 2009, pp. 39, 49 (ASCII Media Works, Inc.) (7 pages).

[Dan Memo] use icons during battle to grasp the state of characters [buff debuff effct], Abiko-san@Ganbaranai, [online] Jul. 18, 2017, https://abikosan.com/danmemo_state, [retrieved on Jun. 29, 2022] (6 pages).

Office Action issued in the counterpart Japanese Patent Application No. 2021-131958, mailed on Mar. 8, 2022 (6 pages).

Office Action issued in the counterpart Japanese Patent Application No. 2021-131958, mailed on Jul. 19, 2022 (6 pages).

[Roma Saga RS] Fateful Great Battle—End of Far Battle—[Live Distribution , Jun. 24, 2021, https://www.youtube.com/watch?v=GUWFzhRsIE [retrieved on Jan. 26, 2026] (6 pages).

[Roma Saga RS] Live The end of a long battle! Igomaruchi, Romancing SaGa Re:Universe, Jun. 25, 2021, https://www.youtube.com/watch?v=BwKqbKY4GKo [retrieved oon Jan. 26, 2026] (4 pages).

Office Action issued in Japanese Patent Application No. 2022-199283, mailed on Feb. 3, 2026 (13 pages).

* cited by examiner

| | FIRST CONDITION | | | | SECOND CONDITION |
|---|---|---|---|---|---|
| | RAID HP | | | | |
| | 1900000000000 | 1000000000000 | 500000000000 | 10000000000 | 0 |
| SUB-BOSS A | GRANTED TO SUB-BOSS A | | | | GRANTED TO SUB-BOSS OTHER THAN SUB-BOSS A |
| | SUPERIORITY BONUS A1 | SUPERIORITY BONUS A2 | SUPERIORITY BONUS A3 | SUPERIORITY BONUS A4 | DESTRUCTION BONUS A |
| SUB-BOSS B | GRANTED TO SUB-BOSS B | | | | GRANTED TO SUB-BOSS OTHER THAN SUB-BOSS B |
| | SUPERIORITY BONUS B1 | SUPERIORITY BONUS B2 | SUPERIORITY BONUS B3 | SUPERIORITY BONUS B4 | DESTRUCTION BONUS B |
| SUB-BOSS C | GRANTED TO SUB-BOSS C | | | | GRANTED TO SUB-BOSS OTHER THAN SUB-BOSS C |
| | SUPERIORITY BONUS C1 | SUPERIORITY BONUS C2 | SUPERIORITY BONUS C3 | SUPERIORITY BONUS C4 | DESTRUCTION BONUS C |
| SUB-BOSS D | GRANTED TO SUB-BOSS D | | | | GRANTED TO SUB-BOSS OTHER THAN SUB-BOSS D |
| | SUPERIORITY BONUS D1 | SUPERIORITY BONUS D2 | SUPERIORITY BONUS D3 | SUPERIORITY BONUS D4 | DESTRUCTION BONUS D |

FIG.8

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/030755, filed on Aug. 12, 2022, which claims priority to Japanese Patent Application No. 2021-131958, filed on Aug. 13, 2021, the entire contents of which are incorporated by reference herein.

BACKGROUND ART

Technical Field

The present invention relates to an information processing program, an information processing method, and an information processing system.

Patent Literature 1 discloses a game in which a player battles against an enemy character in cooperation with another player.

CITATION LIST

Patent Literature

Patent Literature 1: JP 2021-90699 A

SUMMARY OF INVENTION

Technical Problem

In a game as described above, a player who does not possess a powerful character cannot favorably proceed with the game, which may impair the fun of the game.

An object of the present invention is to provide an information processing program, an information processing method, and an information processing system capable of enhancing the fun of a game.

Solution to Problem

In order to solve the aforementioned problem, an information processing program causes a computer to execute: a process for allowing a selection of any of a plurality of opponents including an opponent provided with at least one first condition and an opponent provided with at least one second condition; a process for executing a battle game against the opponent selected by a player; a process for, when the first condition is satisfied in the battle game, granting a first favorable condition favorable to the player in the battle game against the opponent for whom the first condition has been satisfied; and a process for, when the second condition is satisfied in the battle game, granting a second favorable condition favorable to the player in the battle game against an opponent other than the opponent for whom the second condition has been satisfied, wherein the first favorable condition and the second favorable condition can be granted in duplicate in the battle game against one opponent.

A parameter may be set for each of the opponents, the parameter of the opponent may be changed in the process for executing a battle game, and in the process for granting a first favorable condition, when the parameter of the opponent reaches a predetermined value, the first favorable condition may be granted for a predetermined period of time by determining that the first condition has been satisfied.

A parameter may be set for each of the opponents, the parameter of the opponent may be changed in the process for executing a battle game, in the process for granting a second favorable condition, when the parameter of the opponent reaches a particular value, the second favorable condition may be granted by determining that the second condition has been satisfied, and in the process for allowing a selection of any of a plurality of opponents, the selection of the opponent the parameter of whom has reached the particular value may be disabled.

The information processing program may further cause the computer to execute a process for listing the first favorable condition and the second favorable condition granted in the battle game against the opponent so as to be identifiable by the player.

In order to solve the aforementioned problem, an information processing method is an information processing method executed by at least one computer, said method including: a process for allowing a selection of any of a plurality of opponents including an opponent provided with at least one first condition and an opponent provided with at least one second condition; a process for executing a battle game against the opponent selected by a player; a process for, when the first condition is satisfied in the battle game, granting a first favorable condition favorable to the player in the battle game against the opponent for whom the first condition has been satisfied; and a process for, when the second condition is satisfied in the battle game, granting a second favorable condition favorable to the player in the battle game against an opponent other than the opponent for whom the second condition has been satisfied, wherein the first favorable condition and the second favorable condition can be granted in duplicate to one opponent.

In order to solve the aforementioned problem, an information processing system is an information processing system including at least one computer, said computer executing: a process for allowing a selection of any of a plurality of opponents including an opponent provided with at least one first condition and an opponent provided with at least one second condition; a process for executing a battle game against the opponent selected by a player; a process for, when the first condition is satisfied in the battle game, granting a first favorable condition favorable to the player in the battle game against the opponent for whom the first condition has been satisfied; and a process for, when the second condition is satisfied in the battle game, granting a second favorable condition favorable to the player in the battle game against an opponent other than the opponent for whom the second condition has been satisfied, wherein the first favorable condition and the second favorable condition can be granted in duplicate to one opponent.

Effects of Disclosure

According to the present invention, it is possible to enhance the fun of a game.

BRIEF DESCRIPTION OF DRAWINGS

FIG. 8 is a drawing for illustrating an example of a bonus-granting-condition setting table.

DESCRIPTION OF EMBODIMENTS

An aspect of an embodiment according to the present invention will be described in detail below with reference to the accompanying drawings. The dimensions, materials, other specific numerical values, etc. given in this embodiment are merely examples for facilitating understanding and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Overall Configuration of Information Processing System S)

Figure 1:
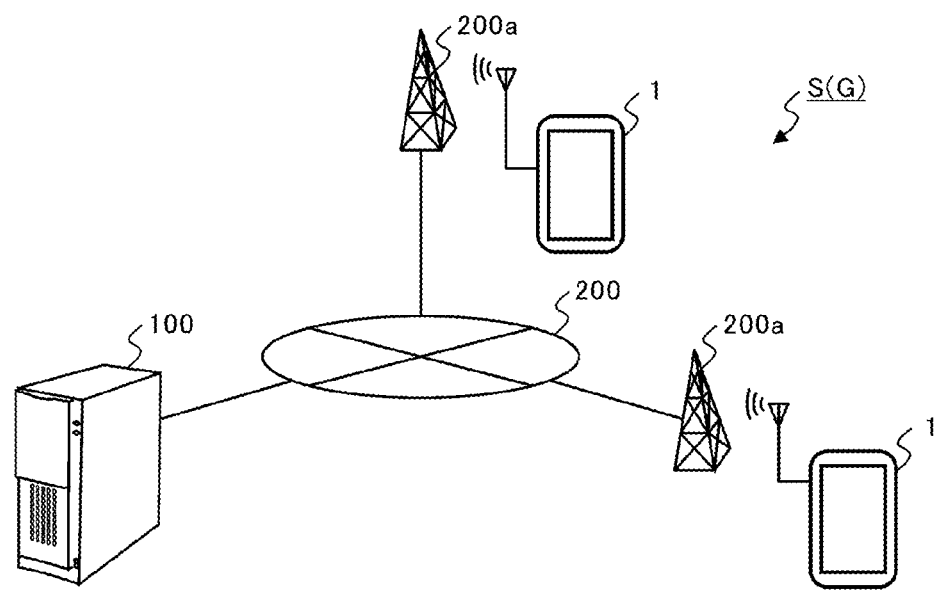
FIG. 1 is an illustration showing a schematic configuration of an information processing system.

FIG. 1 is an illustration showing a schematic configuration of an information processing system S. The information processing system S is a so-called client-server system that includes: player terminals 1; a server 100; and a communication network 200 having communication base stations 200a.

Each of the player terminals (information processing devices) 1 can establish communication with the server 100 via the communication network 200. The player terminals 1 widely include electronic appliances that can be communicatively connected to the server 100 by wire or wirelessly. Examples of the player terminals 1 include smartphones, mobile phones, tablet devices, personal computers, game machines, etc. This embodiment will be described in the context of the case where smartphones are used as the player terminals 1.

The server 100 is configured so as to be capable of communicating with the plurality of player terminals 1 and is communicatively connected to the plurality of player terminals 1. The server 100 accumulates various types of information (player information) for each of the player IDs that identify players playing the game.

The communication base stations 200a are connected to the communication network 200 and transmit information to and receive information from the player terminals 1 wirelessly. The communication network 200 is configured of a mobile phone network, the Internet, a local area network (LAN), a dedicated line, etc., and realizes wired or wireless communicative connection between the player terminals 1 and the server 100.

In the information processing system S according to this embodiment, the player terminals 1 and the server 100 function as a game device G. The player terminals 1 and the server 100 individually have assigned thereto roles for controlling the proceeding of the game such that it is possible to proceed with the game through cooperation between the player terminals 1 and the server 100.

(Hardware Configurations of Player Terminal 1 and Server 100)

Figure 2A:
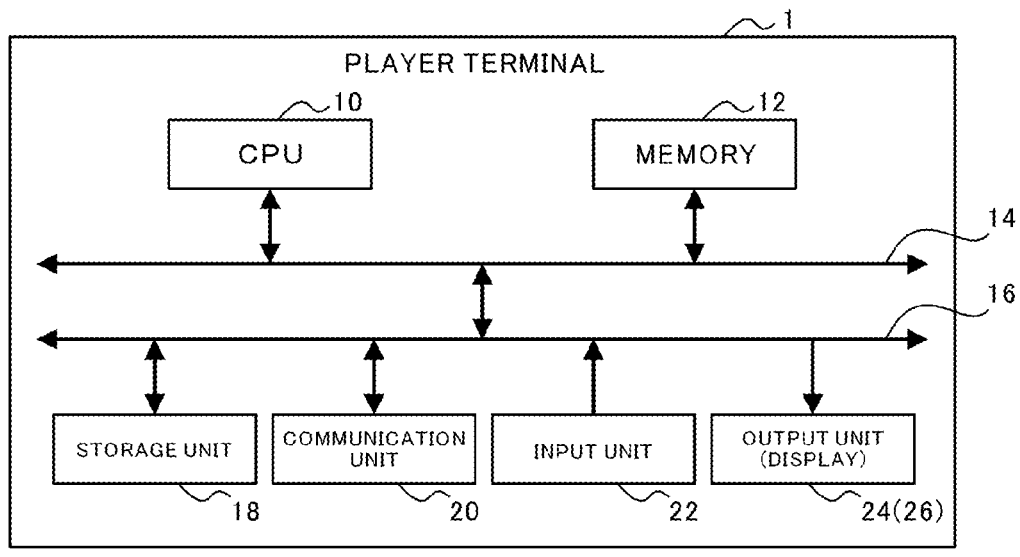
FIG. 2A is a drawing for illustrating the hardware configuration of a player terminal.
Figure 2B:
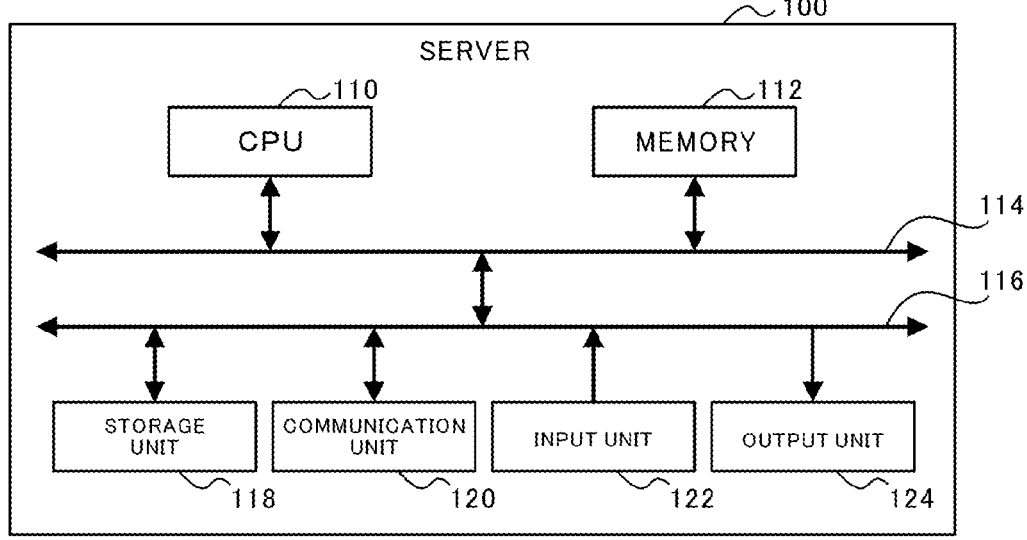
FIG. 2B is a drawing for illustrating the hardware configuration of a server.

FIG. 2A is a drawing for illustrating the hardware configuration of each of the player terminals 1. Also, FIG. 2B is a drawing for illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the server 100 will be omitted.

The CPU 10 runs programs stored in the memory 12 to control the proceeding of the game. The memory 12 is configured of a read only memory (ROM) or a random access memory (RAM), and stores programs and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, programs and data stored in the storage unit 18 are loaded into the memory 12 (RAM) by the CPU 10.

The communication unit 20 is communicatively connected to the communication base stations 200*a* in a wireless manner, and transmits information to and receives information from the server 100 via the communication network 200, such as various kinds of data and programs. At the player terminal 1, the programs, etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects speech of the player. That is, the input unit 22 widely includes devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is overlaid on the display 26.

(Game Content)

Next, content of the game provided by the information processing system S (game device G) according to this embodiment will be described by way of an example. This embodiment provides a so-called battle game in which ally characters combat against enemy characters. More specifically, a plurality of ally characters are provided in the game according to this embodiment. The player selects a plurality of (five here) ally characters from among the provided ally characters, thereby organizing a party. In addition, the player can play a plurality of types of battle games with different enemy characters and difficulty levels. The purpose of a battle game is to earn a reward by beating the enemy characters (clearing the battle game) by means of the ally characters organized into a party.

Figure 3A:
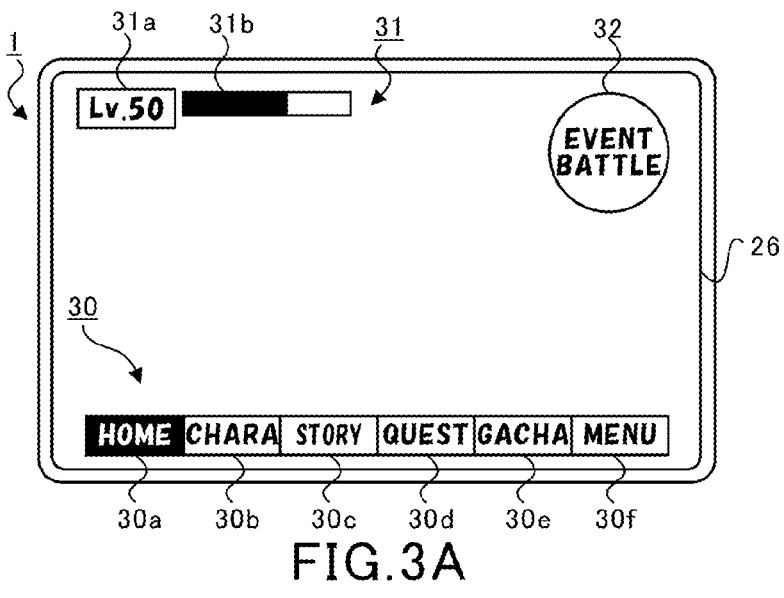
FIG. 3A is a diagram showing an example of a home screen.
Figure 3B:
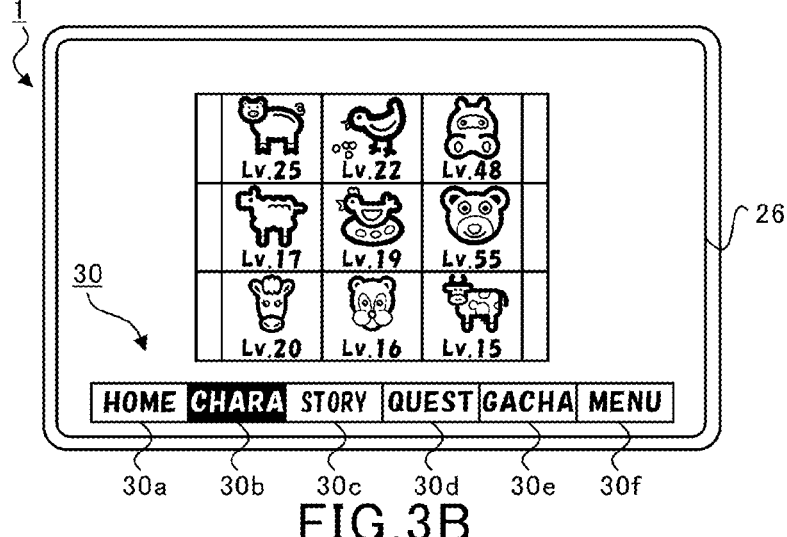
FIG. 3B is a diagram showing an example of an ally character confirmation screen.
Figure 3C:
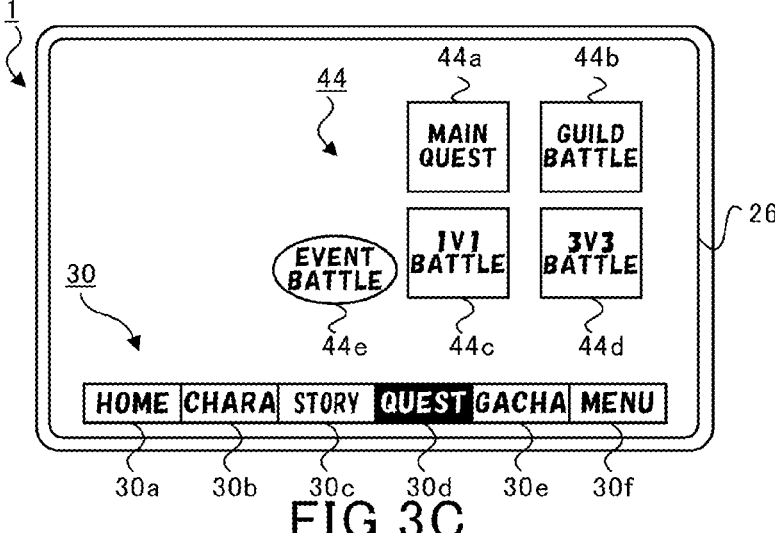
FIG. 3C is a diagram showing an example of a quest screen.

FIG. 3A is a diagram showing an example of a home screen. FIG. 3B is a diagram showing an example of an ally character confirmation screen. FIG. 3C is a diagram showing an example of a quest screen. Game screens as shown in FIGS. 3A, 3B, and 3C are displayed on the display 26 of the player terminal 1. In this embodiment, the game screens are roughly classified into normal screens and a battle screen.

The normal screens mainly include a screen on which the player performs various types of settings and confirms information. On the other hand, the battle screen is a screen displayed on the display 26 from the start to the end of a battle game. Here, all screens other than the battle screen are normal screens. The normal screens include a plurality of screens, such as the home screen shown in FIG. 3A, the ally character confirmation screen shown in FIG. 3B, the quest screen shown in FIG. 3C, a main quest screen (described below) shown in FIG. 4A, an event battle screen (described below) shown in FIGS. 6A and 10B, a support setting screen (described below) shown in FIG. 6B, a gacha screen (not shown in the figure), a menu screen (not shown in the figure), and a shop screen (not shown in the figure).

On the normal screens, a menu bar 30 is displayed in the lower section of the display 26. A plurality of operation sections that can be operated (tapped) by the player are provided in the menu bar 30. A home-screen selection operation section 30*a* captioned "Home", an ally-character confirmation-screen selection operation section 30*b* captioned "Chara", a story-screen selection operation section 30*c* captioned "Story", a quest-screen selection operation section 30*d* captioned "Quest", a gacha-screen selection operation section 30*e* captioned "Gacha", and a menu-screen selection operation section 30*f* captioned "Menu" are provided in the menu bar 30. Note that in the menu bar 30, the operation section corresponding to each screen is highlighted so that the screen being displayed on the display 26 can be identified.

When the home-screen selection operation section 30*a* is tapped, the home screen shown in FIG. 3A is displayed on the display 26. In addition, when the ally-character confirmation-screen selection operation section 30*b* is tapped, the ally character confirmation screen shown in FIG. 3B is displayed on the display 26. In addition, when the story-screen selection operation section 30*c* is tapped, a story screen (not shown in the figure) is displayed on the display 26. When the quest-screen selection operation section 30*d* is tapped, the quest screen shown in FIG. 3C is displayed on the display 26. When the gacha-screen selection operation section 30*e* is tapped, the gacha screen (not shown in the figure) is displayed on the display 26. When the menu-screen selection operation section 30*f* is tapped, the menu screen (not shown in the figure) is displayed on the display 26. Although not described in detail, as a result of the player proceeding with the main quest (described below, refer to FIG. 4A) on the quest screen, a new story is released on the story screen, so that the player can view the released story from the story screen. The gacha screen allows the player to perform a gacha lottery, in which an ally character can be earned by lottery. In addition, game settings and various types of information can be confirmed on the menu screen.

The home screen shown in FIG. 3A corresponds to an initial screen, and a header display region 31 is provided in the upper section. In the header display region 31, level information 31*a* indicating the player level associated with the player ID and a stamina indication bar 31*b* indicating the stamina of the player associated with the player ID are displayed. The level information 31*a* and information concerning the stamina as described above are included in the player information.

Note that the stamina is a parameter required for the player to play a battle game. In this embodiment, a plurality of types of battle games are provided, and each battle game has set therein a stamina consumption value required to play the battle game, the maximum number of times per day the battle game can be executed, etc. In the case where the player is going to play a battle game in which a stamina consumption value required to play the battle game is set, the player can play the battle game by consuming stamina. Therefore, the player cannot play the battle game when the stamina is insufficient.

Although not described in detail, the player can earn a predetermined value as a player experience value when the player wins a battle game. Also, each time the player experience value reaches a certain value, the player level increases. The upper limit of stamina is set in the player level, and as the player level increases, the upper limit of stamina also becomes higher. The stamina recovers every certain period of time (e.g., every five minutes) by a predetermined value (e.g., one point) within the range defined by the upper limit. In the stamina indication bar 31*b*, the current remaining capacity of stamina with respect to the upper limit of stamina is displayed in such a manner as to be visually recognizable.

Also, an event battle operation section 32 is displayed at the right end of the home screen in some cases. In more detail, when the event battle (described below) is held, the event battle operation section 32 captioned "Event battle" is displayed while the event battle is being held.

Then, when the event battle operation section 32 captioned "Event battle" is tapped, the event battle screen (refer to FIGS. 6A and 10B) is displayed on the display 26. Note that while the event battle is not being held, the event battle operation section 32 is hidden.

When the ally-character confirmation-screen selection operation section 30*b* shown in FIG. 3A is tapped, the ally character confirmation screen shown in FIG. 3B is displayed on the display 26. On the ally character confirmation screen, images of all ally characters corresponding to the ally character IDs associated with the player ID are displayed. More specifically, on the ally character confirmation screen, all ally characters possessed by the player are displayed. Note that ally character IDs are used to identify ally characters, and different ally character IDs are assigned to different ally characters. Also, when the player earns a new ally character by, for example, a gacha lottery or the like, the ally character ID of the earned ally character is associated with the player ID of the player. Ally character IDs constitute a portion of the player information.

For each of the ally character IDs, information concerning the experience value and information concerning the level are stored in association with the ally character ID. The experience value increases when the player wins a battle game (described later) or uses a predetermined item. The level is set in accordance with the experience value, and the level increases each time the experience value reaches a predetermined value. Note that each of the ally characters has an upper limit of the level set therefor, and the level increases only within the range defined by the upper limit.

Furthermore, each of the ally characters has set therefor base values of battle abilities, including life points, an attacking power, and a defending power, on the basis of the level. The higher the battle abilities of the ally characters are, the more favorable the player becomes in proceeding with a battle game. Furthermore, the higher the level, the higher the base values set for each of the ally characters.

Furthermore, ally characters can be equipped with items of equipment such as weapons and protectors (ally characters can have items of equipment set thereon). Each of the items of equipment has set therefor additional values to be added to the attacking power, the defending power, etc.

When an ally character is equipped with equipment, the additional values of the equipment are added to the above-described base values, making it possible to enhance the battle abilities of the ally character. Information about these items of equipment such as weapons and protectors is also associated with the ally character ID and constitutes a portion of the player information.

When the quest-screen selection operation section 30*d* shown in FIG. 3A is tapped, the quest screen shown in FIG. 3C is displayed on the display 26. A plurality of game-type selection operation sections 44 captioned with the respective type names of provided battle games are displayed on the quest screen. Here, five types of battle games are provided, and five game-type selection operation sections 44 are displayed accordingly.

The game-type selection operation sections 44 include: a main-quest selection operation section 44*a* captioned "Main quest"; a guild-battle selection operation section 44*b* captioned "Guild battle"; a 1V1-battle selection operation section 44*c* captioned "1V1 battle"; a 3V3-battle selection operation section 44*d* captioned "3V3 battle"; and an event battle operation section 44*e* captioned "Event battle". Note that the event battle operation section 44*e* is displayed while the event battle is being held and is hidden while the event battle is not being held.

Figure 4A:
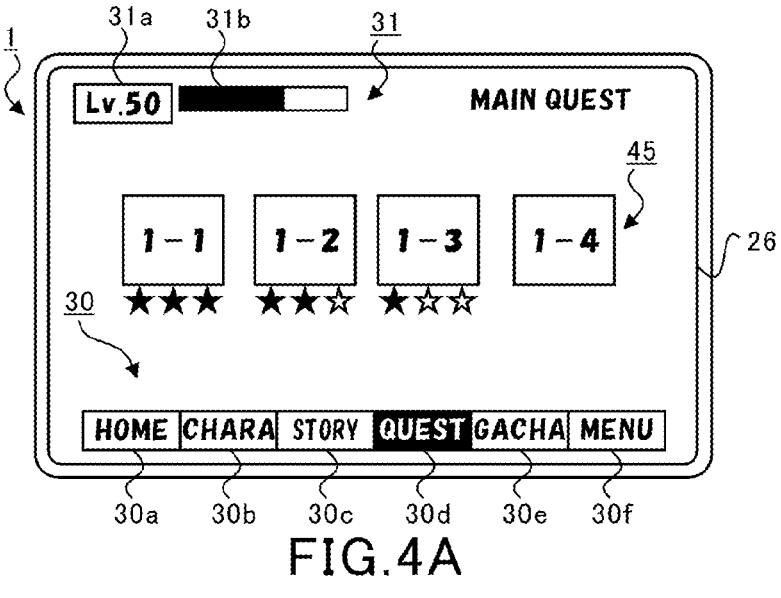
FIG. 4A is a drawing for illustrating an example of a main quest screen.

When the main-quest selection operation section 44*a* is tapped, the main quest screen shown in FIG. 4A is displayed on the display 26. In addition, when the guild-battle selection operation section 44*b* is tapped, a guild battle screen (not shown in the figure) is displayed on the display 26. Similarly, when the 1V1-battle selection operation section 44*c* is tapped, a 1V1 battle screen (not shown in the figure) is displayed on the display 26. Furthermore, when the 3V3-battle selection operation section 44*d* is tapped, a 3V3 battle screen (not shown in the figure) is displayed on the display 26. Also, when the event battle operation section 44*e* is tapped, the event battle screen (refer to FIGS. 6A and 10B) is displayed on the display 26.

Note that some types of battle games have release conditions set therein. The release conditions include, for example, the player level being above a predetermined value, the player viewing a particular story from the story screen, the player having cleared another predetermined battle game, etc. In addition, a plurality of battle games (tiers or rounds) belong to each type of battle game. Each of these battle games also has a release condition set therein. When a release condition is satisfied, game release information included in the player information is updated.

At the player terminal 1, it is determined whether or not each battle game is released on the basis of the game release information, and only a game-type selection operation section 44 of a battle game that satisfies the release condition thereof accepts a player operation (tapping). For this reason, the player can play only battle games that satisfy their respective release conditions.

Figure 4B:
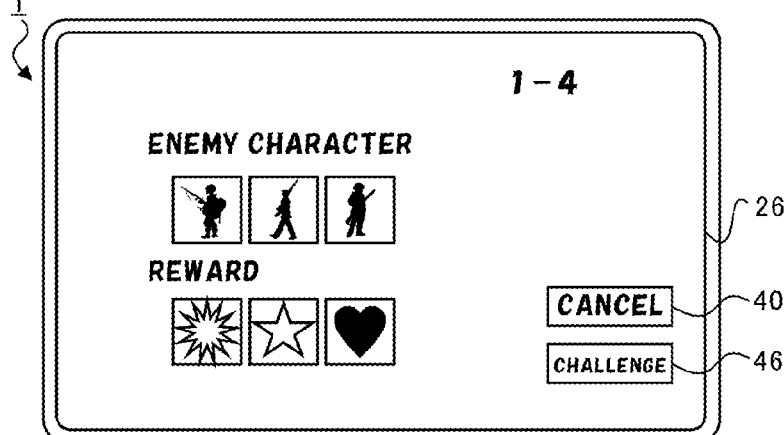
FIG. 4B is a drawing for illustrating an example of a main quest selection screen.
Figure 4C:
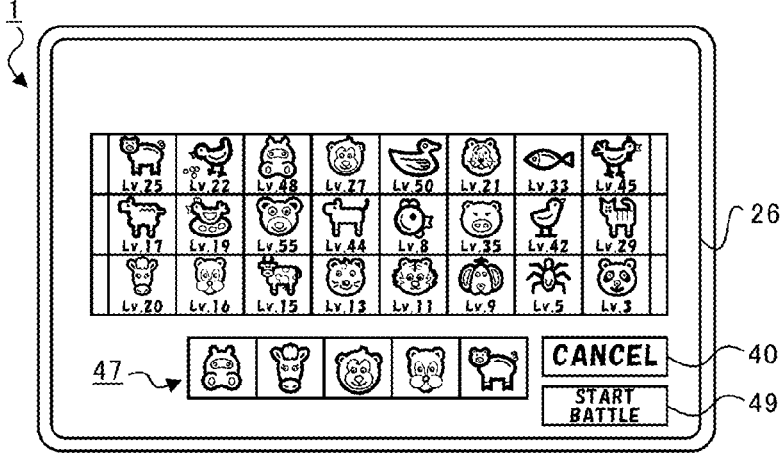
FIG. 4C is a first drawing for illustrating an example of a party selection screen.

FIG. 4A is a drawing for illustrating an example of the main quest screen. FIG. 4B is a drawing for illustrating an example of a main quest selection screen. FIG. 4C is a first drawing for illustrating an example of a party selection screen.

As described above, when the main-quest selection operation section 44*a* is tapped in the game-type selection operation sections 44 shown in FIG. 3C, the main quest screen shown in FIG. 4A is displayed on the display 26.

A quest operation section 45 for selecting a plurality of battle games (tiers) belonging to the main quest is displayed on the main quest screen. Note that the menu bar 30 and the header display region 31 are also displayed on the main quest screen.

In the quest operation section 45, clearance information of the battle games is displayed together. The clearance information is indicated with, for example, three stars. When a battle game belonging to the main quest is cleared, stars are earned according to the number of ally characters whose life points are 0 at the time the battle game is cleared. For example, three stars are earned in the case where there are no ally characters whose life points are 0. Two stars are earned in the case where there is one ally character whose life points are 0. One star is earned in the case where there are two or more ally characters whose life points are 0.

In the example of FIG. 4A, three stars are earned for the "1-1" battle game, two stars are earned for the "1-2" battle game, and one star is earned for the "1-3" battle game. In addition, no stars are earned for the "1-4" battle game, indicating that this battle game is not cleared.

Note that, in the main quest, the release condition that the previous battle game is cleared is set. For example, in the example of FIG. 4A, because the battle games up to the "1-3" battle game are cleared, the "1-4" battle game is released. The subsequent battle games ("1-5" and after, not shown in the figure) are not released.

When the quest operation section 45 corresponding to, for example, the "1-4" battle game is operated (tapped) on the main quest screen, the main quest selection screen shown in FIG. 4B is displayed on the display 26. On the main quest selection screen, enemy characters who will appear in the battle game and items (rewards) that can be earned in the battle game are displayed. In addition, on the main quest selection screen, a challenge operation section 46, captioned "Challenge", for challenging the battle game, as well as a cancel operation section 40, captioned "Cancel", for cancelling the processing corresponding to the currently displayed screen are displayed.

When the cancel operation section 40 is operated (tapped), the main quest screen shown in FIG. 4A is displayed on the display 26, and challenge to the selected "1-4" battle game is cancelled.

On the other hand, when the challenge operation section 46 is operated (tapped), the party selection screen shown in FIG. 4C is displayed on the display 26. On the party selection screen, all ally characters possessed by the player are displayed, and, below the ally characters, a selected-ally-character display region 47 for displaying the selected ally characters is displayed.

In addition, on the party selection screen, the cancel operation section 40 and a battle-start operation section 49, captioned "Start battle", are displayed.

On the party selection screen, when the player operates (taps) a displayed ally character, the operated ally character is displayed in the selected-ally-character display region 47. More specifically, here, ally character IDs to be used in the battle game (to determine a party) are selected from among the plurality of ally character IDs associated with the player ID. A party is organized as a result of the player selecting a plurality of ally characters. Note that the same ally character cannot be set in duplicate in a party organization.

When a party organization is completed and the battle-start operation section 49 is operated (tapped), the battle game is started.

Figure 5A:
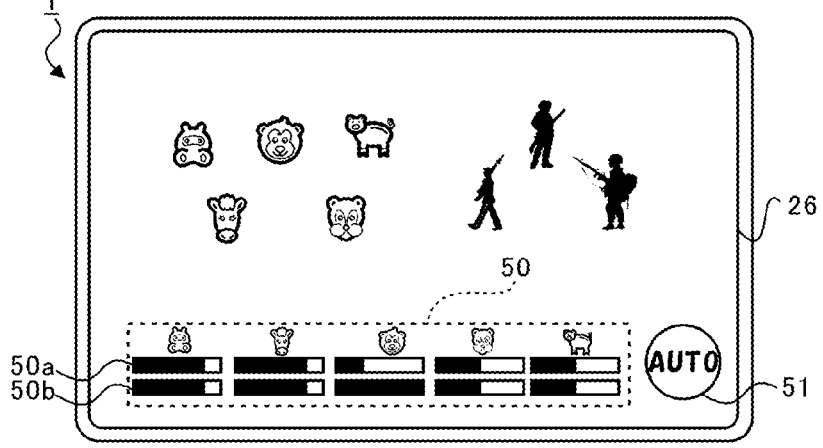
FIG. 5A is a drawing for illustrating an example of a battle screen.
Figure 5B:
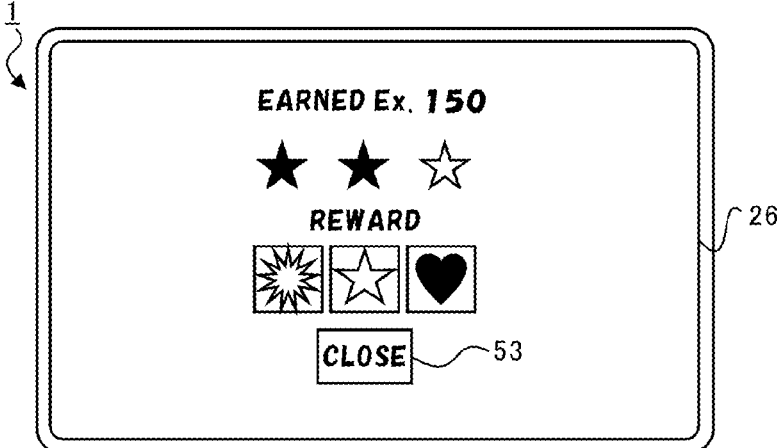
FIG. 5B is a drawing for illustrating an example of a result screen.

FIG. 5A is a drawing for illustrating an example of the battle screen. FIG. 5B is a drawing for illustrating an example of a result screen. When the battle-start operation section 49 is operated (tapped) on the party selection screen shown in FIG. 4C, the battle game is started.

During the battle game, the battle screen, as shown in FIG. 5A, is displayed. On the battle screen, ally characters and enemy characters are displayed on the display 26. The ally characters are operated via computer control, inflicting damage on the enemy characters and suffering damage from the enemy characters. In addition, the enemy characters are operated via computer control, inflicting damage on the ally characters and suffering damage from the ally characters.

When an enemy character is given damage points, the damage points are subtracted from the life points of the enemy character. Similarly, when an ally character is given damage points, the damage points are subtracted from the life points of the ally character. When the life points of all enemy characters become 0, the player wins the battle game (clears the battle game), and when the life points of all ally characters become 0 (loses the battle game), the player loses the battle game.

Here, in the lower section of the battle screen, an ally character display region 50 is provided, as shown in FIG. 5A. In the ally character display region 50, life points 50a and a killer technique gauge 50b for each of the ally characters are displayed. The killer technique gauge 50b increases when the ally character suffers damage from an enemy character or inflicts damage on an enemy character. Also, when the killer technique gauge 50b reaches a prescribed maximum value, that ally character becomes able to use the killer technique. The killer technique gives more damage points to an enemy character than a normal attack, restores the life points of the ally character, produces a special effect on an enemy character, and so on.

Here, there are two patterns of methods for using the killer technique. In one of the patterns, the player operates (taps) an ally character whose killer technique gauge 50b, displayed in the ally character display region 50, has reached the maximum value. In the other pattern, when the killer technique gauge 50b reaches the maximum value in an auto state, the ally character uses the killer technique via computer control. Note that an auto selection operation section 51 is displayed on the battle screen, so that the player can switch between the auto state and a manual state by operating the auto selection operation section 51. When the auto selection operation section 51 is operated in the manual state, the auto state in which the killer technique is used automatically is entered. In addition, when the auto selection operation section 51 is operated in the auto state, the manual state in which the killer technique is used manually is entered. Note that, even in the auto state, the player can also use the killer technique when the player operates (taps) an ally character in a state in which the killer technique gauge 50b reaches the maximum value and the killer technique is not used via computer control.

Then, when the battle game normally ends (normal end), the result screen is displayed on the display 26, as shown in FIG. 5B. FIG. 5B shows the result screen, as an example, in the case where the ally characters have won.

On the result screen, an end operation section 53 captioned "Close" is displayed, together with at least a portion of game result information of the battle game.

Note that the game result information includes: the ally character IDs (party) of ally characters; the enemy character IDs of enemy characters; remaining situations of the ally characters and the enemy characters at the time the battle ended (whether or not the life points were 0 at the time the battle game ended); given damage points (total value); manual state or auto state; a battle log ID; the type of the battle game (main quest, guild battle, etc.); information associated with each type of battle game (clearance information, tier of the battle game, etc.); information concerning granted items; etc. Regarding a determination as to whether the battle game is in the manual state or the auto state, in the case where the battle game is in the auto state from the start to the end of the battle game and the killer technique is not manually used by the player, the battle game is in the auto state; otherwise, the battle game is in the manual state. Also, a unique battle log ID is assigned to each battle game. In addition, information associated with different types of battle games have different items of content from one another.

When the end operation section 53 is operated (tapped) on the result screen, the display on the display 26 switches from the battle screen to a normal screen. In short, the result screen is a portion of the battle screen. Note that the normal screen to which the result screen is switched may be the screen displayed just before being switched to the battle screen or may be a predetermined screen, such as the home screen. In this manner, the battle game ends as the display of the result screen ends.

Figures 6A, 6B:
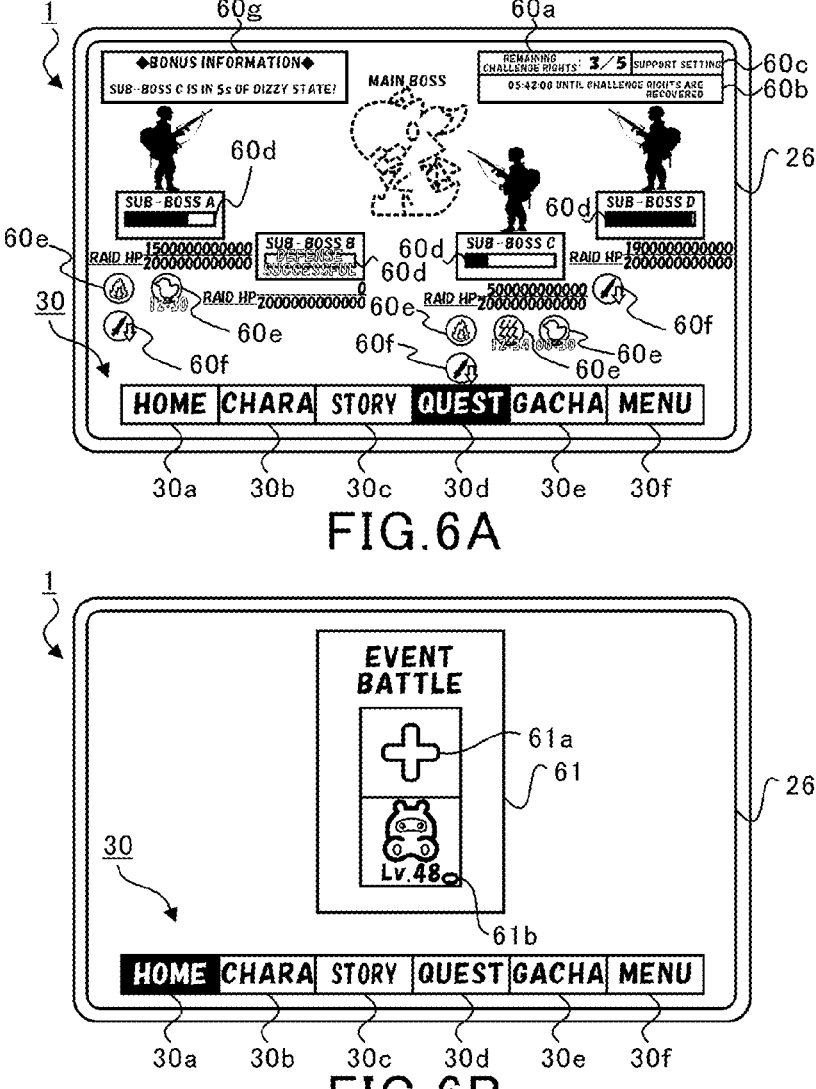
FIG. 6A is a drawing for illustrating an example of an event battle screen.
FIG. 6B is a drawing for illustrating an example of a support setting screen.
Figure 7A:
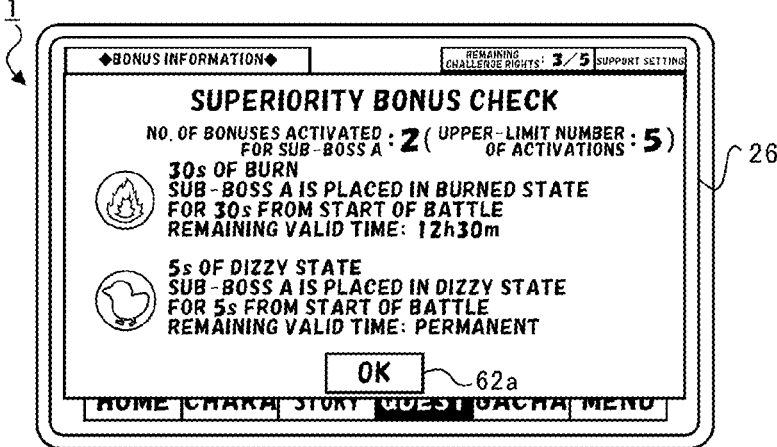
FIG. 7A is a drawing for illustrating an example of a superiority bonus confirmation screen.
Figure 7B:
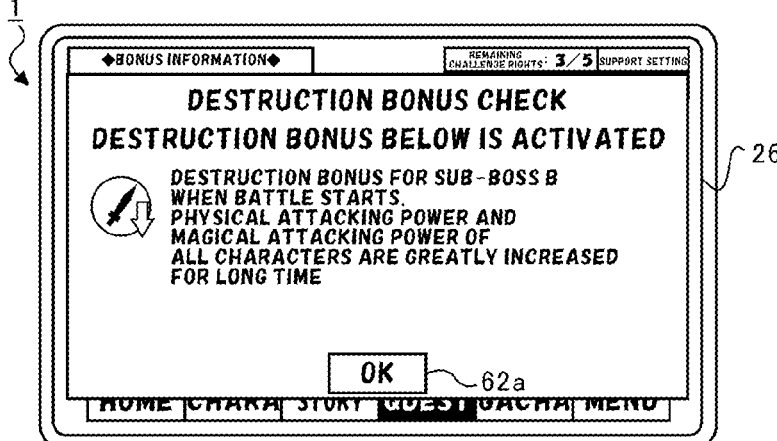
FIG. 7B is a drawing for illustrating an example of a destruction bonus confirmation screen.

Next, the event battle will be described. FIG. 6A is a drawing for illustrating an example of the event battle screen. FIG. 6B is a drawing for illustrating an example of the support setting screen. FIG. 7A is a drawing for illustrating an example of a superiority bonus confirmation screen. FIG. 7B is a drawing for illustrating an example of a destruction bonus confirmation screen.

In the event battle, a battle game in which all players stored in the server 100 combat against powerful enemy characters (sub-bosses in this embodiment) in cooperation with one another is executed. The event battle according to this embodiment is closely related to a story and is a reproduction of a battle game in which the lead character in the story combats against a main boss, subsequently to a particular story. For this reason, the event battle has a participation condition. In this embodiment, the participation condition for a player to participate in the event battle is satisfied when the player operates the story-screen selection operation section 30c shown in FIG. 3A and views a particular story from the story screen (player information includes flag information indicating that the player has viewed the particular story). Thus, players who have viewed the particular story can participate in the event battle. Thus, players who have not viewed the particular story cannot participate in the event battle.

When the event battle operation section 32 captioned "Event battle" shown in FIG. 3A or the event battle operation section 44e shown in FIG. 3C is operated (tapped) while the event battle is being held, the event battle screen shown in FIG. 6A is displayed on the display 26.

The event battle screen displays four sub-bosses (sub-boss A, sub-boss B, sub-boss C, and sub-boss D) and one main boss, as well as a remaining challenge right display region 60a, a challenge right recovery time display region 60b, a support setting operation section 60c, and raid HP display regions 60d.

In this embodiment, when the event battle is held, each player is granted a fixed number of challenge rights that allow the player to challenge the plurality of sub-bosses. For example, the first time each player logs in while the event battle is being held, each player is granted five challenge rights, which allow the player to challenge the sub-bosses. Note that an upper limit is set for the number of challenge rights, and in this embodiment, the upper limit is five.

A player executes a battle game against each of the sub-bosses (also referred to hereinafter as a sub-boss battle), and the player consumes one challenge right when the battle game satisfies an end condition (life points of all ally characters or the sub-boss are 0 or a certain period of time has elapsed). Note that when the player retires in the middle of a battle game, none of the challenge rights are consumed, and the damage points inflicted on the sub-boss during the battle game are also reset.

In the remaining challenge right display region 60a, the current number of remaining challenge rights with respect to the upper limit number of challenge rights is displayed. In the example shown in FIG. 6A, "3" (times) is displayed in the remaining challenge right display region 60a as the number of remaining challenge rights.

The challenge right is granted a predetermined number of times at predetermined time intervals. For example, the challenge right is granted three times every six hours. In the challenge right recovery time display region 60b, the remaining time until the next time the challenge right is granted (restored) is displayed. In the example shown in FIG. 6A, in the challenge right recovery time display region 60b, "05:42:00" (5 hours and 42 minutes) is displayed as the remaining time until the next time the challenge right is granted.

The support setting operation section 60c is displayed on the event battle screen and is displayed only while the event battle is being held. When the support setting operation section 60c is operated (tapped) by the player, the support setting screen shown in FIG. 6B is displayed. On the support setting screen, a support character setting region 61 captioned "Event battle" is displayed. The player can set at most two support characters in the support character setting region 61.

When setting a support character, the player can set an ally character possessed by the player himself/herself as a support character that can be lent to another player. Another player can borrow a support character set by the player to combat against an enemy character. Here, the player can obtain a reward by setting a support character. For example, the player can obtain, as a reward, in-game currency for raising ally characters possessed by the player himself/ herself.

Here, in this embodiment, the player can perform friend setting, follow setting, and support setting, etc. on the menu screen. In the friend setting, the player can perform friend registration of another player. Friend registration is performed such that the player sends a friend request to another player and the other player accepts the friend request or such that the player accepts a friend request sent by another player. When friend registration is completed, the player ID and the other player ID are associated as friends, and the other player ID is stored in the server 100 as the player's friend ID. Note that the player ID is used to identify the player, and different IDs are assigned to different players. In short, an ID different from other player IDs is assigned as the player ID. In the follow setting, the player can perform follow registration of another player. Follow registration is performed by the player sending a follow request to another player and does not require acceptance by the other player. When follow registration is completed, the other player ID is associated with the player ID, and the other player ID is stored in the server 100 as the player's follow ID.

For example, another player can borrow a support character set in the support character setting region 61 from the player, of whom the other player has completed friend registration. Similarly, the player can borrow a support character set in the support character setting region 61 from another player for whom the player has completed friend registration. It should be noted, however, that a support character set in the support character setting region 61 may be borrowed/lent between players who have not completed friend registration of each other (non-friends). For example, the player may borrow a support character set in the support character setting region 61 from another player (non-friend) for whom the player has performed follow registration.

Also, in this embodiment, each player can belong to a guild. Also, the player may be able to borrow a support character set in the support character setting region 61 from another player who belongs to the same guild (guild member). Similarly, a guild member may be able to borrow a support character set in the support character setting region 61 from another player belonging to the same guild.

In the example shown in FIG. 6B, the player has set one support character in the support character setting region 61. The support character ID of the support character set in the support character setting region 61 is associated with the player ID and saved as a portion of the player information. The player information including the support character ID is transmitted from the player terminal 1 to the server 100 and saved in the server 100.

Furthermore, in the example shown in FIG. 6B, an additional-setting-enabled mark 61a with which an additional support character can be set is displayed in the support character setting region 61. By operating (tapping) the additional-setting-enabled mark 61a, the player can add a new support character other than the support character already set in the support character setting region 61.

The support character set in the support character setting region 61 has a setting cancel section 61b. The player can cancel the setting of the support character by operating the setting cancel section 61b. At this time, the association between the player ID and the support character ID is removed, and the information about the support character ID is deleted from the player information. It should be noted, however, that setting of the support character cannot be cancelled until a certain period of time (e.g., 30 minutes) elapses after it was set. The setting cancel section 61b does not accept any operations from the player until a certain period of time elapses after the support character was set. Note that when the holding of the event battle is finished, the support characters set in the support character setting region 61 are automatically cancelled.

When playing a battle game in the "event battle", another player can borrow a support character set by the player in the support character setting region 61. For example, another player can borrow a support character set in the support character setting region 61 of the player. Similarly, the player can borrow a support character set in the support character setting region 61 of another player.

In this embodiment, when the event battle is held, a plurality of sub-bosses are displayed on the display 26 so as to be capable of being selected by the player, as shown in FIG. 6A, thus causing a sub-boss battle in which all players combat against each of the sub-bosses to start.

Each of the sub-bosses has two types of hit points (hereinafter referred to as HP). More specifically, each of the sub-bosses has a raid HP and a battle HP set therefor. In this embodiment, the initial value of the raid HP for each of the sub-bosses is set to 2 trillion, and the initial value of the battle HP for each of the sub-bosses is set to 2 million.

In each sub-boss battle, the battle HP of the sub-boss serving as an opponent is decreased on the basis of the damage inflicted on the sub-boss serving as an opponent, and when the battle HP of the sub-boss serving as an opponent reaches 0, the sub-boss serving as an opponent is defeated. Also, in a sub-boss battle of the event battle, the raid HP of the sub-boss serving as an opponent is decreased on the basis of the damage inflicted by the player on the sub-boss serving as an opponent. Note that each of the sub-bosses has a vanishment condition set therefor, and each of the sub-bosses is designed to revive until its raid HP is reduced to 0, even if it is defeated by the player. Note that a value obtained by calculating, with a predetermined coefficient, the damage inflicted by the player on the sub-boss serving as an opponent in a sub-boss battle may be subtracted from the raid HP of the sub-boss.

Note that the raid HP is a common value among all players participating in the event battle, and the server 100 maintains this value (raid HP) during the event battle period. Each of the sub-bosses vanishes when the raid HP reaches 0, which indicates that the vanishment condition is satisfied. More specifically, the server 100 decreases the raid HP of each of the sub-bosses on the basis of the damage inflicted on the sub-boss by all players participating in the event battle. Then, the server 100 determines whether or not the raid HP of the sub-boss has reached 0 (i.e., whether the vanishment condition for the sub-boss has been satisfied), and if it is determined that the raid HP has reached 0 (the vanishment condition has been satisfied), the server 100 executes a presentation process for making the sub-boss vanish. In other words, parameters (raid HP and battle HP) are set for an opponent, and the parameters (raid HP and battle HP) set for the opponent are changed (reduced) as a result of a sub-boss battle being executed in the event battle. In addition, although this embodiment has been described by way of an example where a sub-boss has both the raid HP and the battle HP, sub-bosses are not limited to this example. For example, a sub-boss may have only the raid HP without having the battle HP. In this case, the damage inflicted by the player on the sub-boss serving as an opponent in a sub-boss battle may be subtracted from the raid HP of the sub-boss serving as an opponent.

As shown in FIG. 6A, the raid HP display region 60d is displayed below each of the sub-bosses. In the raid HP display region 60d, a raid HP indicator bar indicating the remaining raid HP value of the sub-boss is displayed.

When the raid HP indicator bar of a sub-boss displayed in the raid HP display region 60d reaches 0 (i.e., the vanishment condition of the sub-boss is satisfied), that sub-boss vanishes, and a presentation in which that sub-boss vanishes from the event battle screen occurs. In addition, a message denoting that the sub-boss has vanished is shown in the raid HP display region 60d. For example, after the sub-boss has vanished, the wording "Defense successful" is displayed in the raid HP display region 60d. The player can freely combat against any of the four sub-bosses whose vanishment condition has not been satisfied.

In addition, in this embodiment, the player may be granted a superiority bonus (first favorable condition) and a destruction bonus (second favorable condition), which are favorable to the player, in a sub-boss battle against each of the sub-bosses, according to the progress of the sub-boss battle. The superiority bonus (first favorable condition) and the destruction bonus (second favorable condition) granted in a sub-boss battle against each of the sub-bosses are valid for all players in common. It should be noted, however, that it is also possible to provide a superiority bonus (first favorable condition) and a destruction bonus (second favorable condition) that are valid for at least some players. In this case, for example, the superiority bonus (first favorable condition) and the destruction bonus (second favorable condition) may be valid for so-called beginner players. Alternatively, the superiority bonus (first favorable condition) and the destruction bonus (second favorable condition) may be valid only among players who have been registered as guild members or friends.

Note that the contents of the superiority bonus (first favorable condition) and the destruction bonus (second favorable condition) are not particularly limited as long as they are favorable to the player. An example of the superiority bonus (first favorable condition) and the destruction bonus (second favorable condition) is an effect that strengthens characters of the player himself/herself (ally characters or support characters) in the sub-boss battle (e.g., an effect that increases various statuses such as the attacking power and the defending power) or that weakens the sub-boss serving as an opponent (e.g., an effect that reduces the sub-boss's various statuses such as the attacking power and the defending power, inhibits the sub-boss's actions, etc.).

As shown in FIG. 6A, by means of a superiority bonus icon 60e and a destruction bonus icon 60f, the player is informed of the superiority bonuses (first favorable conditions) and the destruction bonuses (second favorable conditions) granted to each of the sub-bosses. As shown in FIG. 6A, a bonus information display section 60g appears in the upper section of the display 26, showing, for a predetermined period of time, information concerning a superiority bonus (first favorable condition) and a destruction bonus (second favorable condition) that are newly granted in a sub-boss battle against each of the sub-bosses. More specifically, the bonus information display section 60g appears, showing, for a predetermined period of time, information concerning a superiority bonus (first favorable condition) and a destruction bonus (second favorable condition) that did not occur at the time of previous transition to the event battle screen and that newly occurred at the time of the current transition to the event battle screen.

As shown in FIG. 6A, in this embodiment, when both the superiority bonus and the destruction bonus are granted in a sub-boss battle against one sub-boss, the superiority bonus icons 60e are listed horizontally in a row below the raid HP display region 60d, and the destruction bonus icons 60f are listed horizontally in a row below the superiority bonus icons 60e. Also, as shown in FIG. 6A, in this embodiment, when only the destruction bonus is granted in a sub-boss battle against one sub-boss, the destruction bonus icons 60f are listed horizontally in a row below the raid HP display region 60d. Furthermore, in this embodiment, when only the superiority bonus is granted in a sub-boss battle against one sub-boss, the superiority bonus icons 60e are listed horizontally in a row below the raid HP display region 60d.

In addition, when the vanishment condition of a sub-boss to which a superiority bonus and a destruction bonus are granted in a sub-boss battle is satisfied (when the raid HP of the sub-boss becomes 0), the superiority bonus icons 60e and the destruction bonus icons 60f displayed for that sub-boss are hidden.

Also, when a superiority bonus icon 60e displayed for each of the sub-bosses is operated (tapped) on the event battle screen, the superiority bonus confirmation screen shown in FIG. 7A is displayed on the display 26. For example, when a superiority bonus icon 60e displayed below "Sub-boss A" is operated (tapped) on the event battle screen, the superiority bonus confirmation screen shown in FIG. 7A is displayed on the display 26. The superiority bonus confirmation screen not only lists the superiority bonuses granted in the sub-boss battle against the sub-boss corresponding to the superiority bonus icon 60e operated (tapped) by the player but also displays an OK operation section 62a captioned "OK". Note that when the OK operation section 62a is operated (tapped) on the superiority bonus confirmation screen, the display of the superiority bonus confirmation screen ends, and the event battle screen is displayed on the display 26.

As shown in FIG. 7A, each of the superiority bonuses has set therefor an effect that is advantageous to the player and a remaining valid time until which the superiority bonus continues to be valid in the sub-boss battle against the sub-boss. Note that when the remaining valid time set for a superiority bonus has elapsed, the superiority bonus granted in the sub-boss battle against the sub-boss vanishes. In addition, a superiority bonus the remaining valid time of which is set to "Permanent" continues to be valid until the vanishment condition of the sub-boss to which the superiority bonus is granted in the sub-boss battle is satisfied. In the superiority bonus icon 60e corresponding to a superiority bonus to which the remaining valid time is set, the remaining valid time is displayed so as to be recognizable, as shown in FIG. 6A. Note that the remaining valid time set for a superiority bonus decreases since the time when the superiority bonus was granted in a sub-boss battle against the sub-boss, regardless of whether or not the sub-boss battle is executed. Note that if the remaining valid time set for a superiority bonus has not expired when the execution of a sub-boss battle is started and the same remaining valid time has expired when the execution of the sub-boss battle is ended, the effect of the superiority bonus is treated as valid in the relevant sub-boss battle. That is, if the remaining valid time set for a superiority bonus is not expired at least at the time a sub-boss battle is started, the superiority bonus is treated as valid in that sub-boss battle.

In addition, in this embodiment, an upper-limit number of superiority bonuses that can be concurrently activated (upper-limit number of activations) is set. This makes it possible to suppress a sub-boss battle becoming too easy to win as a result of unintentional occurrence of a situation that is excessively favorable to the player, thereby enhancing the fun of the game.

Note that if the number of superiority bonuses granted in a sub-boss battle against one sub-boss exceeds the upper limit, it is possible not to grant a superiority bonus resulting from a newly established first condition in the sub-boss battle against that sub-boss. In this case, the superiority bonus newly granted in a state in which the upper-limit number is reached will be disabled and will never be applied even if the number of superiority bonuses subsequently falls below the upper-limit number. Without limitation to this case, however, this disclosure may be configured so that if the number of superiority bonuses granted in a sub-boss battle against one sub-boss exceeds the upper limit, superiority bonuses that were granted earlier in the sub-boss battle against the sub-boss are activated with higher priority. In addition, it is also possible to set a priority order for each type of superiority bonus, so that superiority bonuses with a higher priority order may be activated first. Alternatively, there need not be an upper-limit number of superiority bonuses that can be concurrently activated (upper-limit number of activations).

Furthermore, when a destruction bonus icon 60f displayed for each of the sub-bosses is operated (tapped) on the event battle screen, the destruction bonus confirmation screen shown in FIG. 7B is displayed on the display 26. For example, when the destruction bonus icon 60f displayed below "Sub-boss A" is operated (tapped) on the event battle screen, the destruction bonus confirmation screen shown in FIG. 7B is displayed on the display 26. The destruction bonus confirmation screen not only lists the destruction bonuses granted in the sub-boss battle against the sub-boss corresponding to the destruction bonus icon 60*f* operated (tapped) by the player but also displays the OK operation section 62*a* captioned "OK". Note that when the OK operation section 62*a* is operated (tapped) on the destruction bonus confirmation screen, the display of the destruction bonus confirmation screen ends and the event battle screen is displayed on the display 26.

As shown in FIG. 7B, an effect favorable to the player is set for the destruction bonus. Note that, in this embodiment, the destruction bonus continues to be valid until the vanishment condition of the sub-boss to which the destruction bonus is granted in the sub-boss battle is satisfied. It should be noted, however, that a remaining valid time may be set for the destruction bonus in the same manner as the aforementioned superiority bonus.

FIG. 8 is a drawing for illustrating an example of a bonus-granting-condition setting table. In this embodiment, as shown in FIG. 8, each of the sub-bosses has first conditions and a second condition.

In this embodiment, a plurality of first conditions are set on the basis of the raid HP value of each of the sub-bosses. More specifically, as shown in FIG. 8, there are four first conditions that are satisfied in the following cases: the raid HP reaches (falls below) "1900000000000" as a result of being decreased; the raid HP reaches (falls below) "1000000000000" as a result of being decreased; the raid HP reaches (falls below) "500000000000" as a result of being decreased; and the raid HP reaches (falls below) "10000000000" as a result of being decreased.

Also, as shown in FIG. 8, the type of superiority bonus to be granted when each of the first conditions is satisfied and the type of sub-boss to which the superiority bonus is granted in a sub-boss battle are set in advance. As shown in FIG. 8, this embodiment is set so that a specified type of superiority bonus is granted in a sub-boss battle against each of the sub-bosses for whom a first condition has been satisfied. More specifically, for example, this embodiment is set so that when the raid HP of the sub-boss A reaches "1900000000000", a superiority bonus A1 is granted in the sub-boss battle against the sub-boss A. Note that at least one type of superiority bonus is mapped to each of the superiority bonuses A1 to A4, superiority bonuses B1 to B4, superiority bonuses C1 to C4, and superiority bonuses D1 to D4.

In other words, when a first condition is satisfied in a battle game, a first favorable condition advantageous to the player is granted in a battle game against the opponent for whom the first condition has been satisfied. Also, in other words, when a parameter (raid HP) of the opponent reaches a predetermined value (here, raid HP of "1900000000000", "1000000000000", "500000000000", or "10000000000"), it is determined that a first condition is satisfied, and a first favorable condition (superiority bonus) is granted for a predetermined period of time, accordingly. Note that although this embodiment has been described by way of an example where different types of superiority bonuses are set for each of the sub-bosses, the same type of superiority bonuses may be set among at least some of the sub-bosses. Furthermore, although this embodiment has been described by way of an example where the predetermined values that satisfy the respective first conditions are the same for all sub-bosses, at least some or all of the predetermined values that satisfy the respective first conditions may be different for each of the sub-bosses. In addition, the content of the first favorable condition (advantageous bonus) granted when a first condition is satisfied may be determined by lottery.

Also, in this embodiment, one second condition is set for each of the sub-bosses. More specifically, as shown in FIG. 8, the second condition is satisfied when the raid HP reaches "0". That is, the second condition of each of the sub-bosses is satisfied at the same time as when the vanishment condition of the sub-boss is satisfied.

Also, as shown in FIG. 8, the type of destruction bonus to be granted when each of the second conditions is satisfied and the type of sub-boss to which the destruction bonus is granted in a sub-boss battle are set in advance. As shown in FIG. 8, this embodiment is set so that a specified type of destruction bonus is granted in a sub-boss battle against a sub-boss other than the sub-boss for whom the second condition has been satisfied.

More specifically, for example, this embodiment is set so that when the raid HP of the sub-boss A reaches "0", a destruction bonus A is granted in a sub-boss battle against a sub-boss other than the sub-boss A. Note that at least one type of destruction bonus is mapped to each of the destruction bonus A, a destruction bonus B, a destruction bonus C, and a destruction bonus D.

In other words, when the second condition is satisfied in a battle game, a second favorable condition advantageous to the player is granted in a battle game against an opponent other than the opponent for whom the second condition has been satisfied. Also, in other words, when a parameter (raid HP) of the opponent reaches a particular value (here, raid HP of "0"), it is determined that the second condition is satisfied, and a second favorable condition (destruction bonus) is granted, accordingly.

Note that although this embodiment has been described by way of an example where different types of destruction bonuses are set for each of the sub-bosses, the same type of destruction bonuses may be set among at least some of the sub-bosses.

Note that when a sub-boss other than the sub-boss A has already vanished because the vanishment condition of that sub-boss was satisfied before the second condition for the sub-boss A is satisfied, the destruction bonus is not granted in a sub-boss battle against that sub-boss.

Also, in this embodiment, the superiority bonus and the destruction bonus can be granted in duplicate in a sub-boss battle against one sub-boss. That is, as a sub-boss battle progresses, the number of superiority bonuses and destruction bonuses granted in a sub-boss battle against one sub-boss increases, and hence the further the sub-boss battle progresses, the more advantageously the player can proceed with the sub-boss battle. This suppresses the risk of a player becoming tired of a prolonged sub-boss battle, thereby enhancing the fun of the game.

Note that although this embodiment has been described by way of an example where a plurality of first conditions are provided, and one second condition is provided, this disclosure is not limited to this embodiment. In other words, it suffices if the player can select any of a plurality of opponents (sub-bosses) including an opponent (sub-boss) having at least one first condition and an opponent (sub-boss) having at least one second condition. It is also acceptable that the player can select any of a plurality of opponents (sub-bosses) including, for example, a sub-boss having only a first condition set therefor, a sub-boss having only a second condition set therefor, and a sub-boss having both the first and second conditions set therefor. In addition, an opponent (sub-boss) having neither the first condition nor the second condition set therefor may be included. Furthermore, a particular value of a parameter (raid HP) set for an opponent, said particular value satisfying the second condition, may be the same as one of the predetermined values of parameters set for the opponent, said predetermined value satisfying a first condition.

In addition, although this embodiment has been described by way of an example where the first condition and the second condition are set on the basis of a value of the raid HP, the first condition and the second condition are not limited to the raid HP, and it suffices if any parameter set for an opponent is used as the first condition and the second condition. For example, the first condition and the second condition may be set on the basis of the cumulative value of the number of times the battle HP of each of the sub-bosses is "0" (i.e., the number of times each of the sub-bosses is defeated) in a sub-boss battle. Furthermore, the first and second conditions may also be set on the basis of various conditions (parameters) in a sub-boss battle, such as the cumulative number of times a killer technique is used against each of the sub-bosses, whether or not a predetermined item possessed by each player has been used, etc. In any case, it is a good idea that, in a battle game (sub-boss battle) against an opponent (sub-boss), a first favorable condition (superiority bonus) is granted for a predetermined period of time by determining that a first condition is satisfied when a parameter set for the opponent (sub-boss) reaches a predetermined value as a result of the parameter set for the opponent (sub-boss) being changed, and a second favorable condition (destruction bonus) is granted by determining that a second condition is satisfied when the parameter set for the opponent (sub-boss) reaches a particular value.

Figure 9A:
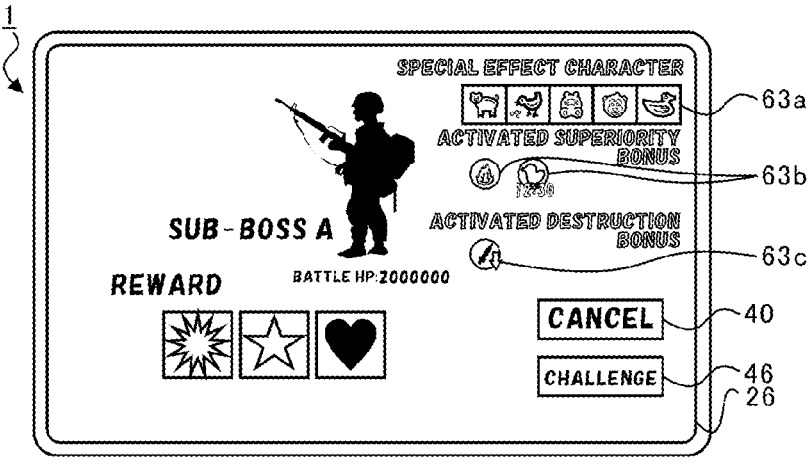
FIG. 9A is a drawing for illustrating an example of an event battle selection screen.
Figure 9B:
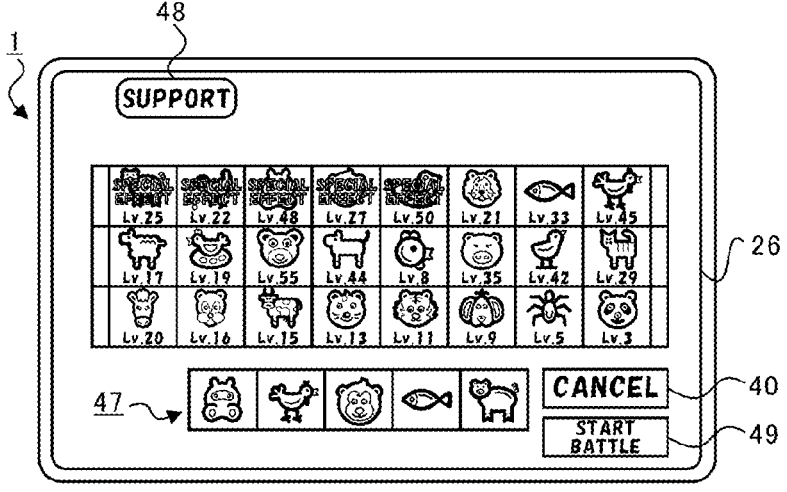
FIG. 9B is a drawing for illustrating an example of the party selection screen.
Figure 9C:
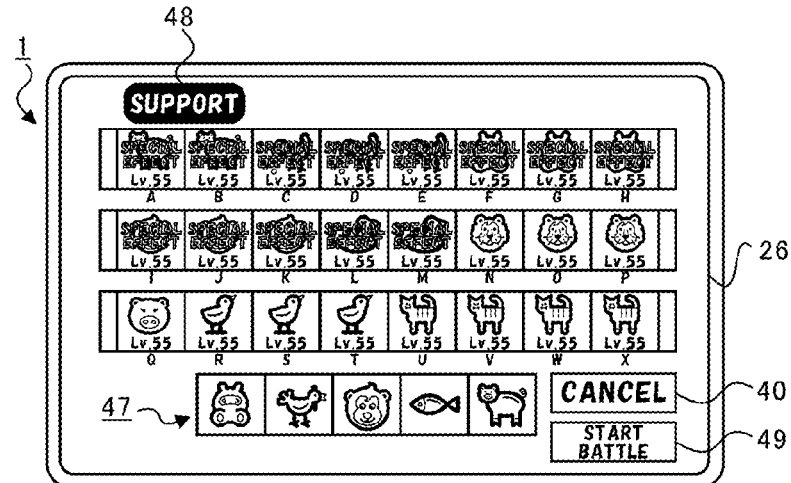
FIG. 9C is a drawing for illustrating an example of a support character selection screen.

FIG. 9A is a drawing for illustrating an example of an event battle selection screen. FIG. 9B is a drawing for illustrating an example of the party selection screen. FIG. 9C is a drawing for illustrating an example of a support character selection screen. When, for example, "Sub boss A" is operated (tapped) on the event battle screen, the event battle selection screen shown in FIG. 9A is displayed on the display 26. On the event battle selection screen, an enemy character (sub-boss A) who will appear in the battle game and items (rewards) that can be earned in the battle game are displayed. On the event battle selection screen, a special effect character display section 63a, superiority bonus display sections 63b, a destruction bonus display section 63c, the challenge operation section 46, and the cancel operation section 40 are displayed.

A total of five (five types) ally characters are displayed in the special effect character display section 63a. In this embodiment, each of the sub-bosses has a plurality of special effect characters set therefor in advance, and a sub-boss battle will progress in a manner favorable to the player when the sub-boss battle is executed using the special effect characters set for the sub-boss. In this embodiment, each of the sub-bosses has a plurality of special effect characters linked to the story (scenario). For example, use of special effect characters in a sub-boss battle allows a correction value set for each of the special effect characters to be added to or multiplied by various parameters (level, HP, attacking power, etc.) at the time of damage calculation, thereby deriving a damage computation result that is favorable to the player. Note that this embodiment is set so that correction values set for ally characters are larger than those set for support characters. Note that, unlike the sub-boss battle, a special effect character as described above is not set in a main boss battle (described below).

The superiority bonus display sections 63b list the types of superiority bonuses (first favorable conditions) granted in the sub-boss battle against the enemy character (sub-boss A) displayed on the event battle selection screen. Then, when a superiority bonus display section 63b is operated (tapped), the superiority bonus confirmation screen shown in FIG. 7A is displayed on the display 26.

The destruction bonus display section 63c lists the type of destruction bonus (second favorable condition) granted in the sub-boss battle against the enemy character (sub-boss A) displayed on the event battle selection screen. Then, when the destruction bonus display section 63c is operated (tapped), the destruction bonus confirmation screen shown in FIG. 7B is displayed on the display 26.

When the cancel operation section 40 is operated (tapped), the event battle screen shown in FIG. 6A is displayed on the display 26, and challenge to the battle game against the selected "sub-boss A" is cancelled.

On the other hand, when the challenge operation section 46 is operated (tapped), the party selection screen shown in FIG. 9B is displayed on the display 26. On the party selection screen, all ally characters possessed by the player are displayed, the selected-ally-character display region 47 is displayed at the bottom, and a support-character selection operation section 48 is displayed at the top. The cancel operation section 40 and the battle-start operation section 49 are also displayed on the party selection screen.

On the party selection screen, when the player operates (taps) a displayed ally character, the operated ally character is displayed in the selected-ally-character display region 47, thus organizing a party. Note that the player needs to include at least one of the ally characters possessed by the player himself/herself when organizing a party for the event battle.

Here, as shown in FIG. 9B, the special effect characters set for the selected sub-boss are identifiably displayed on the party selection screen. More specifically, an ally character set as a special effect character is captioned "Special effect".

Therefore, the player can easily organize, into a party, five types of special effect characters that allow the player to proceed with the sub-boss battle advantageously. Note that, in this embodiment, different special effect characters are set for each of the sub-bosses. This requires the player to take the special effect characters into account when organizing a party in a battle game against each of the sub-bosses, thereby improving the strategic nature of the game and enhancing the fun of the game. Note that it is also possible to make the set special effect characters common among all sub-bosses.

Furthermore, when the support-character selection operation section 48 is operated (tapped) on the party selection screen, the support character selection screen shown in FIG. 9C is displayed. On the support character selection screen, the support characters set by other players in the support character setting region 61 captioned "Event battle" are displayed.

Here, as shown in FIG. 9C, the special effect characters set for the selected sub-boss are identifiably displayed on the support character selection screen. More specifically, the support characters set as the special effect characters are captioned "Special effect". Note that, in this embodiment, one ally character set as a special effect character allows the player to proceed with the sub-boss battle in a manner more advantageous to the player than one support character set as a special effect character. In other words, when organizing the same special effect character into a party, the player has a greater advantage when the player himself/herself possesses that special effect character than when the player borrows that special effect character from another player.

When the player operates (taps) a support character displayed on the support character selection screen, the operated support character is displayed in the selected-ally-character display region 47.

Note that, in a battle game belonging to the event battle, an upper limit (e.g., four) may be set for the number of support characters to be selected. In short, a battle game belonging to the event battle may be configured so that the player can borrow, for example, up to four support characters. Without limitation to this case, however, the number of support characters that the player can borrow may vary depending on, for example, the type of sub-boss and the main boss (described below).

Figures 10A, 10B, 10C:
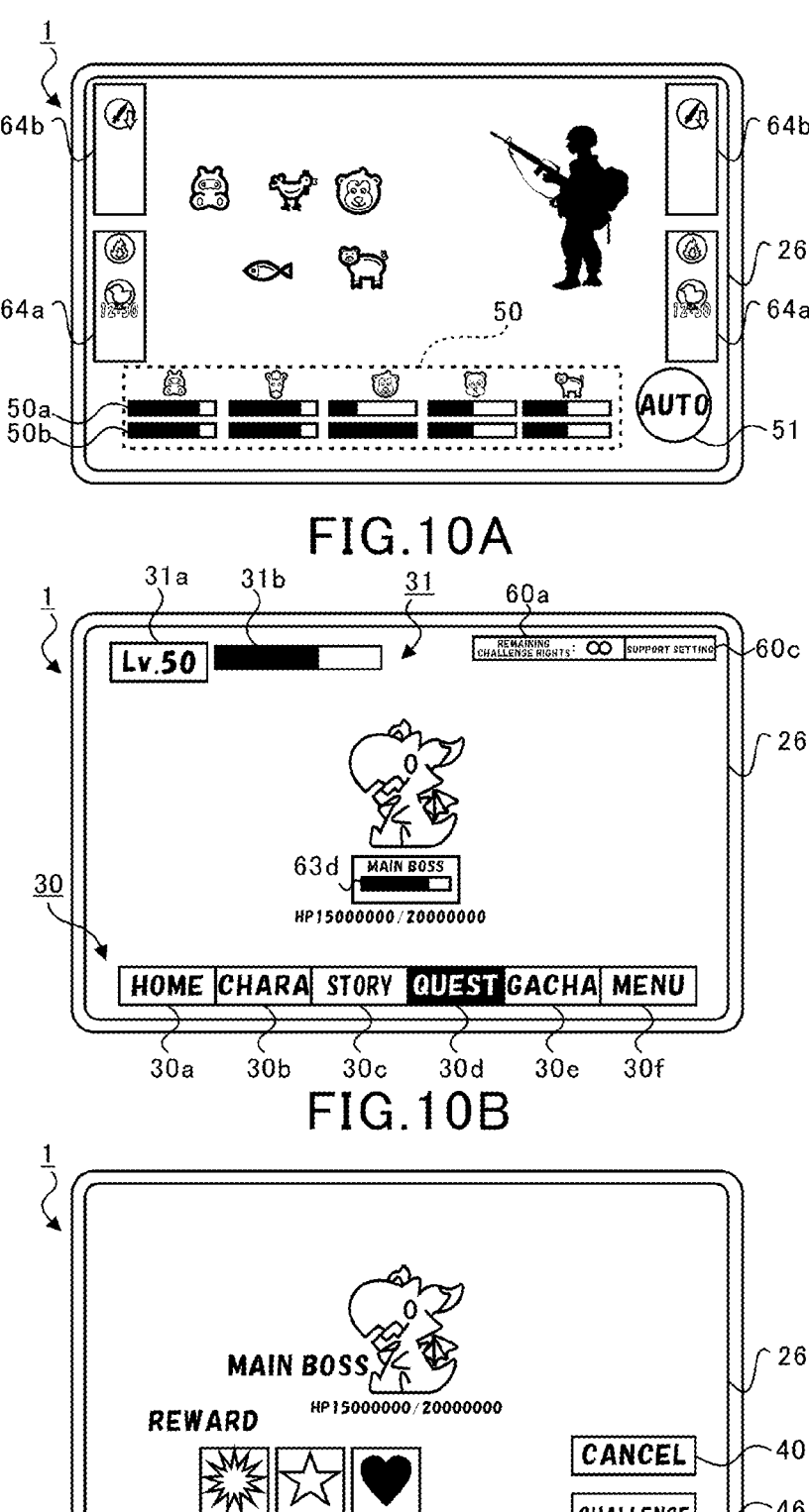
FIG. 10A is a drawing for illustrating an example of a battle screen related to a sub-boss battle.
FIG. 10B is a drawing for illustrating an example of the event battle screen.
FIG. 10C is a drawing for illustrating an example of the event battle selection screen.

When party organization is completed and the battle-start operation section 49 is operated (tapped), the battle game starts. Basic parts of the battle game are the same as those of the main quest, and parts that differ from those of the main quest will be described. FIG. 10A is a drawing for illustrating an example of a battle screen related to a sub-boss battle. As shown in FIG. 10A, superiority bonus display sections 64a and destruction bonus display sections 64b are displayed on the left and right sides of the battle screen related to a sub-boss battle.

The superiority bonus display sections 64a list the types of superiority bonuses (first favorable conditions) granted in the sub-boss battle against the enemy character (sub-boss A) displayed on the event battle selection screen. Then, when a superiority bonus display section 64a is operated (tapped), the superiority bonus confirmation screen shown in FIG. 7A is displayed on the display 26.

The destruction bonus display sections 64b list the types of destruction bonuses (second favorable conditions) granted in the sub-boss battle against the enemy character (sub-boss A) displayed on the event battle selection screen. Then, when a destruction bonus display section 64b is operated (tapped), the destruction bonus confirmation screen shown in FIG. 7B is displayed on the display 26.

In a battle game in the main quest, the player's stamina is consumed to play the battle game, whereas in a sub-boss battle, the player's stamina is not consumed, but the challenge rights granted to the player are consumed.

In addition, there are two types of rewards for a sub-boss battle game: a single-body crushing reward granted when one sub-boss is crushed as a result of the battle HP becoming 0; and a vanishment reward granted when the vanishment condition for the sub-boss is satisfied. The single-body crushing reward is a reward earned only by the player who has crushed one sub-boss. The player can earn a single-body crushing reward each time he/she crushes one sub-boss. It should be noted, however, that even if another player crushes one sub-boss, the player cannot earn a single-body crushing reward. The vanishment reward for a sub-boss is a common reward that can be earned, after the sub-boss has vanished, by all players who access the event battle screen during the event battle.

The event battle includes a battle game in which the player combats against a main boss (hereinafter, referred to as a main-boss battle), in addition to the sub-boss battle in which the player combats against a sub-boss. The main-boss battle is displayed on the event battle screen when all sub-bosses vanish in a sub-boss battle or when a certain period of time has elapsed since the start of the event battle. In short, the player cannot combat against the main boss until all sub-bosses vanish in a sub-boss battle or a certain period of time elapses since the start of the event. Note that if there are any remaining sub-bosses when a certain period of time has elapsed from the start of the event, an event causing all remaining sub-bosses to be forced to vanish occurs, and after all sub-bosses have vanished, an event causing the main boss to appear occurs.

Figure 11A:
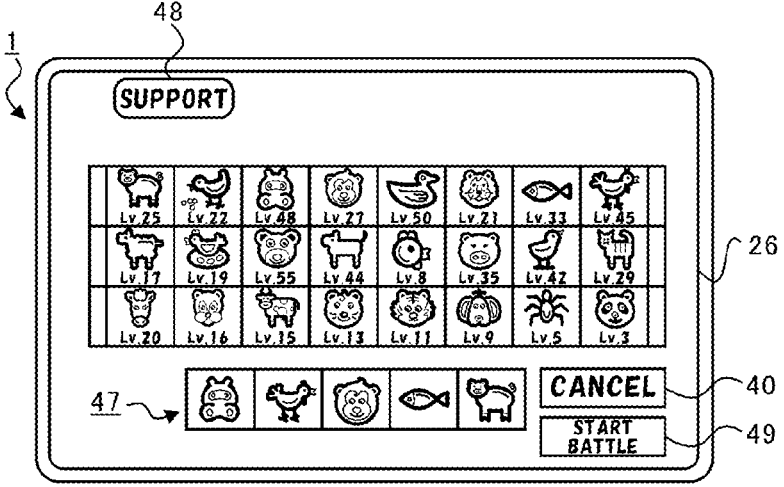
FIG. 11A is a drawing for illustrating an example of the party selection screen.
Figure 11B:
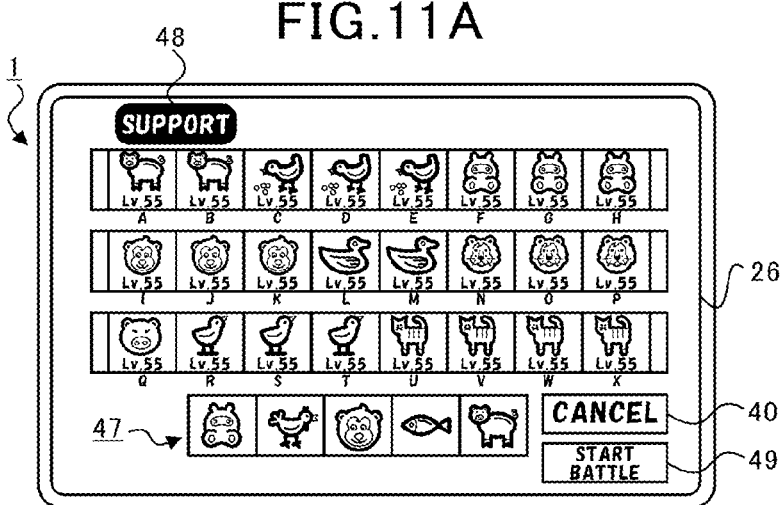
FIG. 11B is a drawing for illustrating an example of the support character selection screen.

FIG. 10B is a drawing for illustrating an example of the event battle screen. FIG. 10C is a drawing for illustrating an example of the event battle selection screen. FIG. 11A is a drawing for illustrating an example of the party selection screen. FIG. 11B is a drawing for illustrating an example of the support character selection screen.

FIG. 10B shows the event battle screen after all sub-bosses have vanished in a sub-boss battle or a certain period of time has elapsed since the start of the event. The remaining challenge right display region 60a, the support setting operation section 60c, and a HP indicator bar 63d are displayed on the event battle screen, in addition to one main boss.

Unlike the sub-boss battle, players combat against the main boss individually in the main boss battle. In short, in the main boss battle, it is not possible for all players to cooperate with one another to combat against the main boss. In the main-boss battle, however, it may be possible for all players to cooperate with one another to combat against the main boss.

In this embodiment, each player is granted an unlimited number of challenges to the main boss once the main boss battle is started. Therefore, a character indicating that the challenge rights are unlimited is displayed in the remaining challenge right display region 60a. Also, because the challenge rights are unlimited, the event battle screen of the main boss battle shown in FIG. 10B does not display the challenge right recovery time display region 60b, which appears on the event battle screen of the sub-boss battle shown in FIG. 6A.

The support setting operation section 60c is also displayed on the event battle screen of the main boss battle shown in FIG. 10B, in the same manner as on the event battle screen of the sub-boss battle shown in FIG. 6A. When the support setting operation section 60c is operated (tapped), the support setting screen shown in FIG. 6B is displayed.

Also in the main-boss battle, when playing a battle game in the "event battle", another player can borrow a support character set by the player in the support character setting region 61. Similarly, the player can borrow a support character set in the support character setting region 61 of another player.

As shown in FIG. 10B, the HP indicator bar 63d is displayed below the main boss. Each player can defeat the main boss by reducing the HP of the main boss to 0 in the main boss battle. In short, the victory condition for each player is to reduce the HP (HP indicator bar 63d) of the main boss to 0. Note that, in this embodiment, one type of HP is set for the main boss. More specifically, the initial value of HP of the main boss is set to 20 million. That is, this embodiment is set so that the HP of the main boss is lower than the raid HP of each of the sub-bosses and higher than the battle HP of each of the sub-bosses. However, this embodiment may be set so that the HP of the main boss is equal to or less than the battle HP of each of the sub-bosses. Also, the HP of the main boss may be set to different values for each player. For example, this embodiment may be set so that the HP of the main boss is higher for an advanced player than for a beginner player.

When "Main boss" is operated (tapped) on the event battle screen, the event battle selection screen shown in FIG. 10C is displayed on the display 26. On the event battle selection screen, an enemy character (main boss) who will appear in the battle game and items (rewards) that can be earned in the battle game are displayed. In addition, on the event battle selection screen, the challenge operation section 46 for challenging the battle game and the cancel operation section 40 are displayed.

When the cancel operation section 40 is operated (tapped), the event battle screen shown in FIG. 10B is displayed on the display 26, and the challenge to the battle game against the selected "main boss" is canceled.

In this embodiment, unlike the sub-boss battle, a special effect character described above is not set in the main boss battle. Also, in a main boss battle against the main boss, the superiority and destruction bonuses described above are not granted. For this reason, on the event battle screen of the main boss battle as shown in FIG. 10B, the superiority bonus icons 60e and the destruction bonus icons 60f, which appear on the event battle screen of the sub-boss battle as shown in FIG. 6A, are not displayed. Also, as shown in FIG. 10C, the event battle selection screen of the main boss battle does not display the special effect character display section 63a, the superiority bonus display sections 63b, and the destruction bonus display section 63c, which appear on the event battle selection screen of the sub-boss battle shown in FIG. 9A.

On the other hand, when the challenge operation section 46 is operated (tapped), the party selection screen shown in FIG. 11A is displayed on the display 26. On the party selection screen, all ally characters possessed by the player are displayed, the selected-ally-character display region 47 is displayed at the bottom, and the support-character selection operation section 48 is displayed at the top. The cancel operation section 40 and the battle-start operation section 49 are also displayed on the party selection screen.

On the party selection screen, when the player operates (taps) a displayed ally character, the operated ally character is displayed in the selected-ally-character display region 47, thus organizing a party.

Furthermore, when the support-character selection operation section 48 is operated (tapped) on the party selection screen, the support character selection screen shown in FIG. 11B is displayed. On the support character selection screen, the support characters set by other players in the support character setting region 61 captioned "Event battle" are displayed.

Note that, unlike the sub-boss battle, the aforementioned special effect character is not set in the main boss battle, as described above. For this reason, on the party selection screen of the main boss battle as shown in FIG. 11A, no ally characters are captioned "Special effect", which is attached to ally characters that are set as special effect characters on the party selection screen of sub-boss battles shown in FIG. 9B. Similarly, on the support character selection screen of the main boss battle as shown in FIG. 11B, no ally characters are captioned "Special effect", which is attached to ally characters that are set as special effect characters on the support character selection screen of the sub-boss battle shown in FIG. 9C.

When the player operates (taps) a support character displayed on the support character selection screen, the operated support character is displayed in the selected-ally-character display region 47.

Note that, in the main-boss battle, an upper limit (e.g., four) may be set for the number of support characters to be selected, as in the sub-boss battle.

When party organization is completed and the battle-start operation section 49 is operated (tapped), the battle game starts. Basic parts of the battle game are the same as those of the sub-boss battle and the main quest, and a description thereof will be omitted. Note that, unlike the sub-boss battle, the main boss battle provides an unlimited number of challenge rights and does not require the player to consume stamina, and hence the player can challenge the main boss battle as many times as they wish until he/she satisfies the victory condition. Note that, as described above, neither the superiority bonus nor the destruction bonus is granted in the main boss battle against the main boss. For this reason, the battle game screen of the main boss battle does not show the superiority bonus display sections 64a and the destruction bonus display sections 64b, which appear on the battle game screen of the sub-boss battle shown in FIG. 10A.

When the event battle holding period ends, the event battle operation section 32 shown in FIG. 3A and the event battle operation section 44e shown in FIG. 3C are hidden, disabling the player from accessing the event battle screen. Therefore, players who were not able to log in the game while the event battle was being held or who were not able to defeat the main boss while the event battle was being held will lose the opportunity to challenge the main boss battle. It should be noted, however, that, after the end of the event battle holding period, a separate event in which a player by himself/herself can challenge the main boss battle may be held separately. The value of each HP (raid HP and battle HP) in such an event can be set lower than the value of each HP while the event battle is being held.

Next, basic configurations and communication processing of the player terminal 1 and the server 100 for executing the event battle will be described. Note that an example of basic communication processing for proceeding with the game, as well as main communication processing related to the event battle, will be described here, and the description of other processing will be omitted.

(Functional Configuration of Player Terminal 1)

Figure 12:
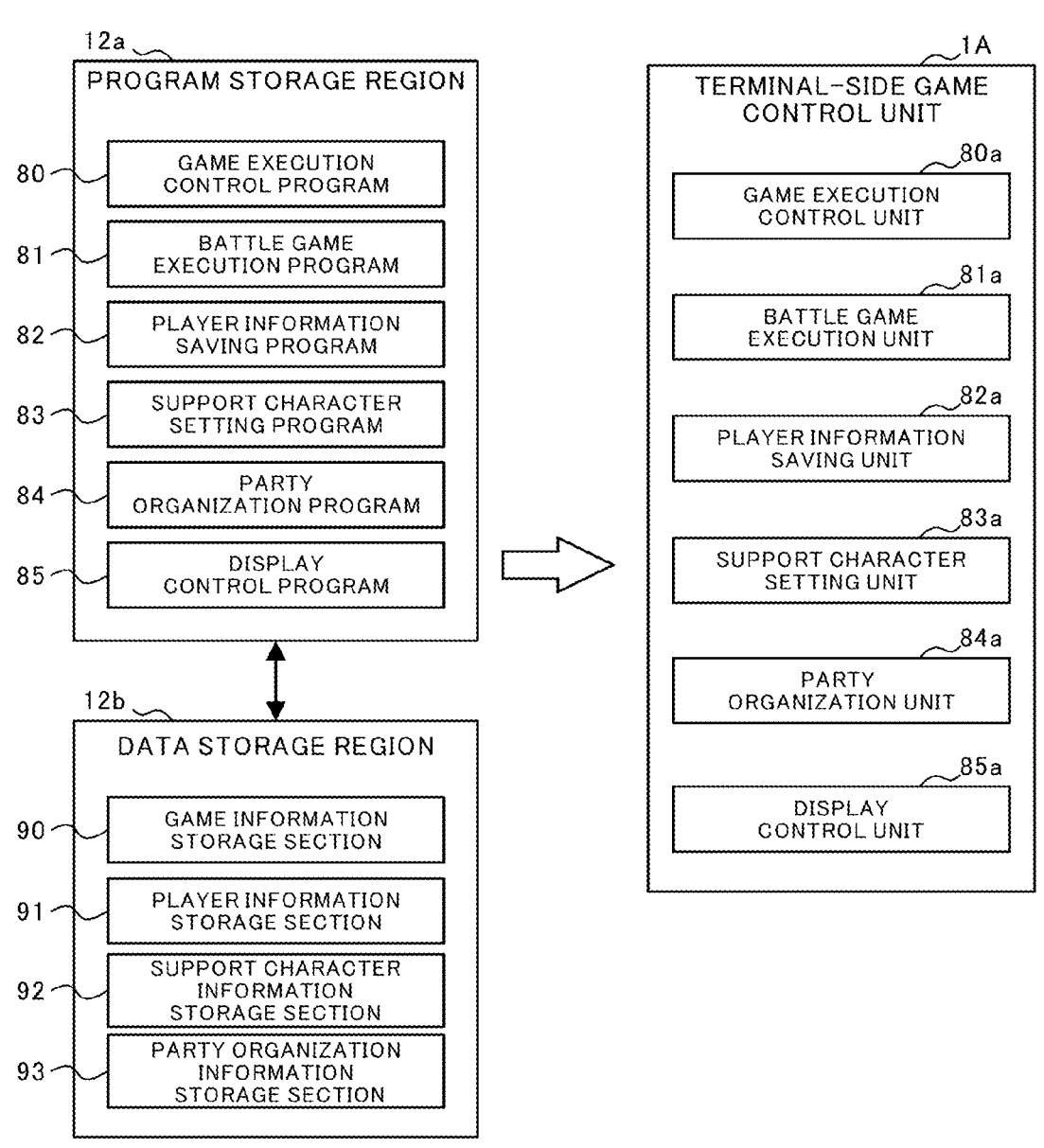
FIG. 12 is a diagram for illustrating the configuration of a memory in the player terminal and functions of the player terminal as a computer.

FIG. 12 is a diagram for illustrating the configuration of the memory 12 in the player terminal 1 and functions of the player terminal 1 as a computer. A program storage region 12a and a data storage region 12b are provided in the memory 12. When the game is started, the CPU 10 stores terminal-side game control programs (modules) in the program storage region 12a.

The terminal-side game control programs include: a game execution control program 80; a battle game execution program 81; a player information saving program 82; a support character setting program 83; a party organization program 84; and a display control program 85. The programs listed in FIG. 12 are examples, and many other programs are provided as the terminal-side game control programs.

In the data storage region 12b, a game information storage section 90, a player information storage section 91, a support character information storage section 92, and a party organization information storage section 93 are provided as storage sections for storing data. Each of the aforementioned storage sections is an example, and many other storage sections are provided in the data storage region 12b.

The CPU 10 operates the programs stored in the program storage region 12a and updates data in each of the storage sections in the data storage region 12b. Also, the CPU 10 causes the player terminal 1 (computer) to function as a terminal-side game control unit 1A by operating the programs stored in the program storage region 12a. The terminal-side game control unit 1A includes: a game execution control unit 80a, a battle game execution unit 81a, a player information saving unit 82a, a support character setting unit 83a, a party organization unit 84a, and a display control unit 85a.

More specifically, the CPU 10 causes the computer to function as the game execution control unit 80a by operating the game execution control program 80. Similarly, the CPU 10 causes the computer to function as the battle game execution unit 81*a*, the player information saving unit 82*a*, the support character setting unit 83*a*, the party organization unit 84*a*, and the display control unit 85*a* by operating the battle game execution program 81, the player information saving program 82, the support character setting program 83, the party organization program 84, and the display control program 85, respectively.

The game execution control unit 80*a* controls the proceeding of the entire game. For example, the game execution control unit 80*a* transmits login information to the server 100 when the player logs in the game. Also, the game execution control unit 80*a* acquires event information from the server 100 and saves the event information in the game information storage section 90. The event information includes the following information in the event battle: the raid HP and battle HP of each of the sub-bosses; superiority bonus information including whether or not a superiority bonus is granted and the type of the granted superiority bonus; destruction bonus information including whether or not a destruction bonus is granted and the type of the granted destruction bonus; and information concerning the type of special effect character, etc.

The battle game execution unit 81*a* is responsible for controlling the execution of a battle game. For example, on the basis of an operation input to the player terminal 1, the battle game execution unit 81*a* updates the battle screen, controls the motion of ally characters and enemy characters, and derives damage points.

More specifically, the battle game execution unit 81*a* allows the player to select any of a plurality of opponents (sub-bosses) including an opponent (sub-boss) provided with at least one first condition and an opponent (sub-boss) provided with at least one second condition in the event battle. Also, the battle game execution unit 81*a* disables the player from selecting a sub-boss whose raid HP is 0. Then, the battle game execution unit 81*a* executes a battle game against the opponent (sub-boss or main boss) selected by the player.

Furthermore, if a superiority bonus or a destruction bonus is granted in a sub-boss battle against a sub-boss serving as an opponent, the battle game execution unit 81*a* derives damage points on the basis of the granted superiority bonus or destruction bonus. At this time, if a superiority bonus and a destruction bonus are granted in duplicate in a sub-boss battle against one sub-boss, the battle game execution unit 81*a* derives damage points on the basis of both the superiority bonus and the destruction bonus.

The player information saving unit 82*a* saves, in the player information storage section 91, the player information acquired from the server 100. In addition, when the player information is changed according to a player operation, the player information saving unit 82*a* saves the changed player information in the player information storage section 91 and transmits the changed player information to the server 100. Here, the player information includes the player ID, ally character IDs, support character IDs, etc. This makes it possible for the server 100 to determine whether or not each player satisfies a participation condition for participating in the event battle (main-boss battle) on the basis of the player information of each player.

The support character setting unit 83*a* sets a support character of the player on the basis of a player input operation to the support character setting region 61. Also, the support character setting unit 83*a* saves information concerning the set support character (support character information: support character ID) in the support character information storage section 92, and transmits the information to the server 100.

The party organization unit 84*a* executes a party organization on the basis of a player input operation to the party selection screen. Furthermore, the party organization unit 84*a* saves information concerning the organized party (party organization information: ally character IDs and support character IDs) in the party organization information storage section 93 and transmits the information to the server 100.

The display control unit 85*a* generates screens to be displayed on the display 26 and displays the generated screens on the display 26. For example, as shown in FIGS. 6A, 9A, and 10A, the display control unit 85*a* lists superiority bonuses (first favorable conditions) and destruction bonuses (second favorable conditions) granted in a sub-boss battle against an opponent so as to be identifiable by the player.

(Functional Configuration of Server 100)

Figure 13:
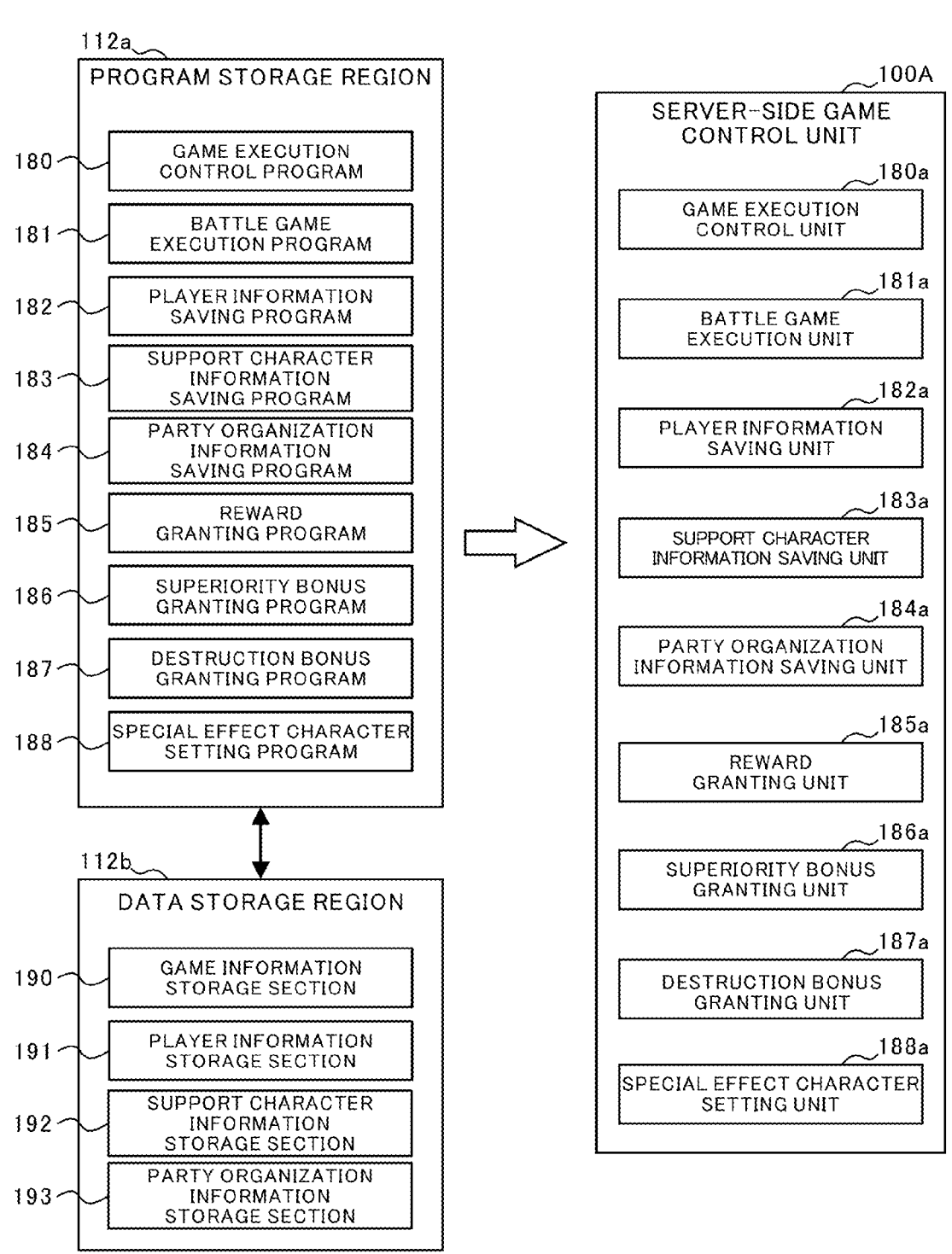
FIG. 13 is a diagram for illustrating the configuration of a memory in the server and functions of the server as a computer.

FIG. 13 is a diagram for illustrating the configuration of the memory 112 in the server 100 and functions of the server 100 as a computer. A program storage region 112*a* and a data storage region 112*b* are provided in the memory 112. When the game is started, the CPU 110 stores server-side game control programs (modules) in the program storage region 112*a*.

The server-side game control programs include: a game execution control program 180, a battle game execution program 181, a player information saving program 182, a support character information saving program 183, a party organization information saving program 184, a reward granting program 185, a superiority bonus granting program 186, a destruction bonus granting program 187, and a special effect character setting program 188. The programs listed in FIG. 13 are examples, and many other programs are provided as the server-side game control programs.

In the data storage region 112*b*, a game information storage section 190, a player information storage section 191, a support character information storage section 192, and a party organization information storage section 193 are provided as storage sections for storing data. Each of the aforementioned storage sections is an example, and many other storage sections are provided in the data storage region 112*b*.

The CPU 110 operates the programs stored in the program storage region 112*a* and updates data in each of the storage sections in the data storage region 112*b*. Also, the CPU 110 causes the server 100 to function as a server-side game control unit 100A by operating the programs stored in the program storage region 112*a*. The server-side game control unit 100A includes a game execution control unit 180*a*, a battle game execution unit 181*a*, a player information saving unit 182*a*, a support character information saving unit 183*a*, a party organization information saving unit 184*a*, a reward granting unit 185*a*, a superiority bonus granting unit 186*a*, a destruction bonus granting unit 187*a*, and a special effect character setting unit 188*a*.

More specifically, the CPU 110 causes the computer to function as the game execution control unit 180*a* by operating the game execution control program 180. Similarly, the CPU 110 causes the computer to function as the battle game execution unit 181*a*, the player information saving unit 182*a*, the support character information saving unit 183*a*, the party organization information saving unit 184*a*, the reward granting unit 185*a*, the superiority bonus granting unit 186*a*, the destruction bonus granting unit 187*a*, and the special effect character setting unit 188*a* by operating the battle game execution program 181, the player information saving program 182, the support character information saving program 183, the party organization information saving program 184, the reward granting program 185, the superiority bonus granting program 186, the destruction bonus granting program 187, and the special effect character setting program 188, respectively.

The game execution control unit 180a controls the proceeding of the entire game. For example, upon receiving login information from the player terminal 1, the game execution control unit 180a sets event information saved in the game information storage section 190, player information saved in the player information storage section 191, support character information saved in the support character information storage section 192, and party organization information saved in the party organization information storage section 193 so as to be downloadable by the player terminal 1.

The battle game execution unit 181a manages the battle HP and the raid HP of each of the sub-bosses while the event battle is being held. More specifically, the battle game execution unit 181a decreases the battle HP and the raid HP of each of the sub-boss A, the sub-boss B, the sub-boss C, and the sub-boss D on the basis of the results of sub-boss battles executed by each player participating in the event battle against the sub-bosses. Also, the battle game execution unit 181a allows each of the sub-bosses to continue to survive if the raid HP of the sub-boss does not reach 0 and vanishes each of the sub-bosses when the raid HP of the sub-boss reaches 0. In addition, the battle game execution unit 181a causes each of the sub-bosses to continue to survive if the battle HP of the sub-boss does not reach 0 and crushes each of the sub-bosses when the battle HP of the sub-boss reaches 0.

Upon receiving player information (e.g., game result information) from the player terminal 1, the player information saving unit 182a saves the received player information in the player information storage section 191.

Upon receiving support character information from the player terminal 1, the support character information saving unit 183a saves the received support character information in the support character information storage section 192. At this time, the support character information saving unit 183a saves the support character ID in association with the player ID. Note that the support character information includes: information concerning the type of the support character (support character ID); and status information concerning the status of the support character (information concerning the level of the support character, information concerning equipment, information concerning the HP, information concerning the attacking power, information concerning the defending power, etc.).

Upon receiving party organization information from the player terminal 1, the party organization information saving unit 184a saves the received party organization information in the party organization information storage section 193.

The reward granting unit 185a grants a reward to a player. The reward granting unit 185a grants a player who has cleared a battle game an item corresponding to the battle game that has been cleared. More specifically, the reward granting unit 185a adds the granted item to the player information corresponding to the player ID of the player who has cleared the battle game and saves the player information in the player information storage section 191.

The superiority bonus granting unit 186a refers to the bonus-granting-condition setting table shown in FIG. 8 and updates superiority bonus information concerning a sub-boss for whom a first condition has been satisfied. That is, the superiority bonus granting unit 186a determines that a first condition for an opponent has been satisfied when a parameter (raid HP) of the opponent reaches a predetermined value, thereby granting a first favorable condition (superiority bonus) for a predetermined period of time.

The destruction bonus granting unit 187a refers to the bonus-granting-condition setting table shown in FIG. 8 and updates destruction bonus information concerning a surviving (raid HP of larger than 0) sub-boss other than the sub-boss for whom the second condition has been satisfied. That is, when the second condition for an opponent is satisfied in a battle game, the destruction bonus granting unit 187a grants a second favorable condition favorable to the player to an opponent other than the opponent for whom the second condition has been satisfied. In addition, in other words, when a parameter (raid HP) of an opponent reaches a particular value, the destruction bonus granting unit 187a determines that the second condition for the opponent has been satisfied and grants a second favorable condition (destruction bonus). Furthermore, the destruction bonus granting unit 187a sets the event information saved in the game information storage section 190 so as to be acquirable by the player terminal 1.

The special effect character setting unit 188a sets a special effect character to each of the sub-bosses.

(Communication Processing Between Player Terminal 1 and Server 100)

Figure 14:
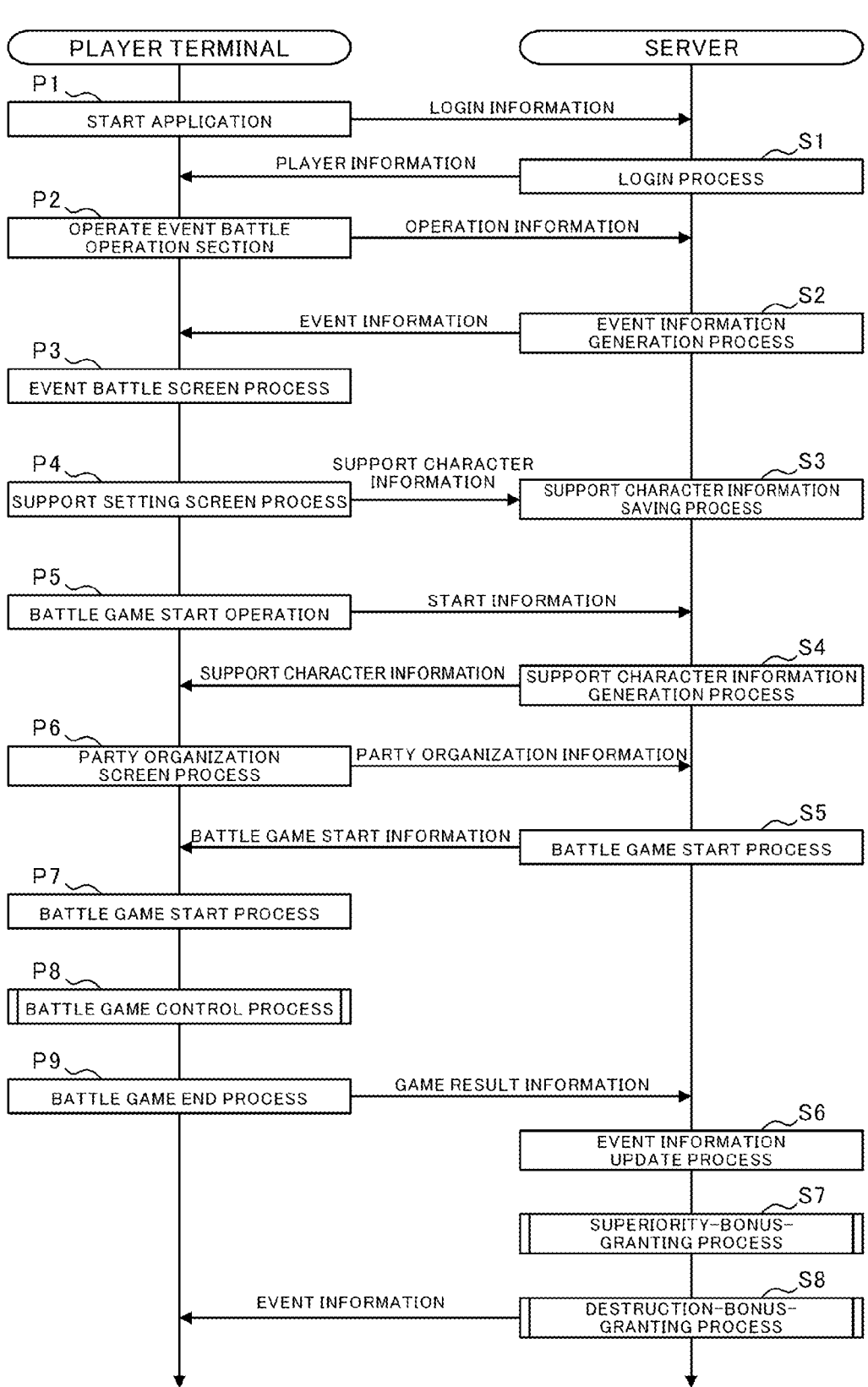
FIG. 14 is a sequence diagram for illustrating basic processing of the player terminal and the server.

FIG. 14 is a sequence diagram for illustrating basic processing of the player terminal 1 and the server 100. Note that, in the following description, processes in the player terminal 1 are denoted as Pn (n is any integer). Furthermore, processes in the server 100 are denoted as Sn (n is any integer).

When the player starts the game application on the player terminal 1 (P1), the game execution control unit 80a transmits login information to the server 100. Upon receiving the login information, the game execution control unit 180a of the server 100 executes a login process by identifying the player ID associated with the login information (S1). Here, the game execution control unit 180a sets the player information corresponding to the identified player ID so as to be downloadable by the player terminal 1 from the player information storage section 191.

In addition, when the player operates the event battle operation section 32 or the event battle operation section 44e while the event battle is being held, the game execution control unit 80a of the player terminal 1 transmits operation information to the server 100 (P2).

Upon receiving the operation information, the game execution control unit 180a of the server 100 sets event information saved in the game information storage section 190 so as to be acquirable by the player terminal 1 (S2).

Upon acquiring the event information, the game execution control unit 80a and the display control unit 85a of the player terminal 1 execute processing (event battle screen process) for displaying, on the display 26, the event battle screen (FIG. 6A or 10B) on the basis of the acquired event information (P3).

In addition, when the support setting operation section 60c is operated by the player on the event battle screen, the game execution control unit 80a and the display control unit 85a of the player terminal 1 execute processing (support setting screen process) for displaying the support character setting region 61 on the display 26 (P3).

When the player sets a support character in the support character setting region 61, the support character setting unit 83*a* of the player terminal 1 saves the set support character information (support character ID) in the support character information storage section 92, and transmits the support character information to the server 100 (P4). Upon receiving the support character information from the player terminal 1, the support character information saving unit 183*a* of the server 100 executes processing (support character information saving process) for saving the received support character information in the support character information storage section 192 in association with the player ID (S3).

When the player executes a battle game start operation (operation on the challenge operation section 46), the battle game execution unit 81*a* and the display control unit 85*a* of the player terminal 1 transmit start information to the server 100 (P5) and display the party selection screen on the display 26. This start information includes the player information, battle information, etc. Here, the battle information includes information concerning the type of the battle game selected by the player, enemy character IDs, etc. Note that when displaying the party selection screen on the display 26, the display control unit 85*a* of the player terminal 1 captions an ally character set as a special effect character "Special effect" on the basis of the event information.

When the player operates an ally character displayed on the party selection screen or the support character selection screen, the party organization unit 84*a* of the player terminal 1 executes processing (party organization screen process) for organizing the operated ally character into a party (P6). In addition, in the party organization screen process (P6), the display control unit 85*a* of the player terminal 1 displays the support character selection screen on the display 26 when the player operates the support-character selection operation section 48 on the party selection screen, and displays the party selection screen on the display 26 when the player operates the support-character selection operation section 48 on the support character selection screen. Furthermore, when displaying the party selection screen on the display 26, the display control unit 85*a* of the player terminal 1 captions a support character set as a special effect character "Special effect" on the basis of the event information.

In the party organization screen process (P6), when party organization is completed and the battle-start operation section 49 is operated, the party organization unit 84*a* saves party organization information in the party organization information storage section 93 and transmits the party organization information to the server 100.

Upon receiving the party organization information from the player terminal 1, the server 100 executes a battle game start process (S5). In the battle game start process (S5), the party organization information saving unit 184*a* of the server 100 saves the party organization information received from the player terminal 1 in the party organization information storage section 193.

Furthermore, in the battle game start process (S5), the battle game execution unit 181*a* of the server 100 sets battle game start information and event information needed to start a battle game so as to be acquirable by the player terminal 1.

Also, upon acquiring the battle game start information, the battle game execution unit 81*a* of the player terminal 1 executes a battle game start process for starting a battle game (P7). Here, for example, the battle game execution unit 81*a* secures a region of the memory 12 for proceeding with the battle game and reads predetermined programs from the storage unit 18 to the memory 12. Furthermore, the game execution control unit 80*a* stores the event information acquired from the server 100 in the game information storage section 90.

Figure 15:
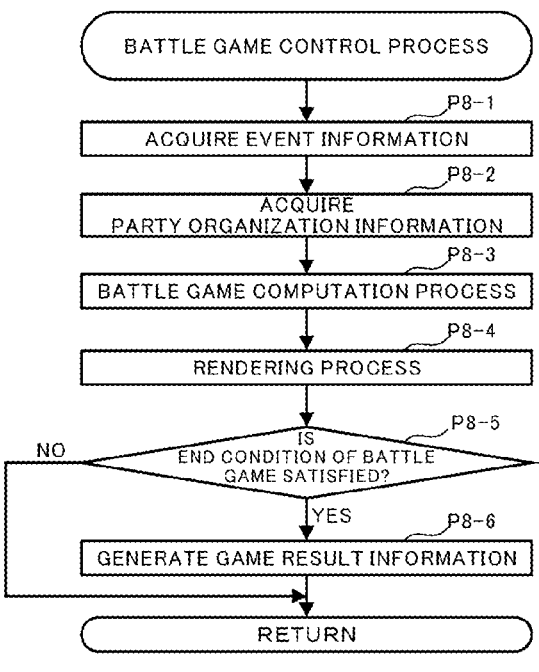
FIG. 15 is a flowchart for illustrating an example of a battle game control process in the player terminal.

Thereafter, the battle game execution unit 81*a* of the player terminal 1 executes a battle game control process for controlling the battle game (P8). FIG. 15 is a flowchart for illustrating an example of the battle game control process in the player terminal 1. In this battle game control process, an update process for updating various types of information is repeatedly executed on a frame by frame basis. Note that the number of frames is not particularly limited; for example, the number of frames per second is 30 to 60. Thus, during the battle game, information is updated at intervals of about 16 ms to 33 ms at the player terminal 1.

The battle game execution unit 81*a* of the player terminal 1 acquires event information stored in the game information storage section 90 (P8-1) and acquires party organization information stored in the party organization information storage section 93 (P8-2).

The battle game execution unit 81*a* of the player terminal 1 causes the enemy character and an ally character to perform a move action and an attack action in accordance with a predetermined algorithm, on the basis of information such as information concerning the type of special effect character, superiority bonus information, and destruction bonus information included in the event information acquired in step P8-1 above, party organization information acquired in step P8-2 above, and so on. The battle game execution unit 81*a* executes a battle game computation process for computing damage inflicted when an ally character attacks the enemy character and when the enemy character attacks an ally character (P8-3). That is, it can also be considered that, in the battle game computation process, a first favorable condition favorable to the player is granted in a battle game against the opponent for whom a first condition has been satisfied, and a second favorable condition favorable to the player is granted in a battle game against an opponent other than the opponent for whom the second condition has been satisfied.

More specifically, for example, a damage computation result that is favorable to the player is derived by adding and multiplying various types of parameters (fixed values and values according to the character and the sub-boss) set for each type of superiority bonus and destruction bonus at the time of damage computation. In addition, for example, an enemy character for a superiority bonus (hereinafter, referred to as a first stealth character) and an enemy character for a destruction bonus (hereinafter, referred to as a second stealth character) may be placed so as to be unidentifiable by the player and so as not to be an opponent in the battle, that is, as in-game objects for setting bonuses. In this case, it suffices if a skill corresponding to superiority bonus information concerning the sub-boss serving as an opponent is set for the placed first stealth character and a skill corresponding to destruction bonus information concerning the sub-boss serving as an opponent is set for the placed second stealth character.

The display control unit 85*a* of the player terminal 1 executes a rendering process for rendering the battle screen on the display 26 on the basis of the processing in step P8-3 above (P8-4).

Then, the battle game execution unit 81*a* of the player terminal 1 determines whether or not the end condition of the battle game is satisfied (P8-5). If the result indicates that the end condition of the battle game is satisfied, the flow proceeds to step P8-6. If the result indicates that the end condition of the battle game is not satisfied, the battle game control process ends.

When the end condition of the battle game is satisfied, the battle game execution unit 81a of the player terminal 1 generates game result information and ends the battle game control process (P8-6).

Referring back to FIG. 14, the battle game execution unit 81a of the player terminal 1 executes a battle game end process for transmitting the game result information generated in step P8-6 above to the server 100 and for displaying the result screen on the display 26 (P9).

Upon receiving the game result information, the battle game execution unit 181a of the server 100 executes an event information update process for updating the event information (S6). More specifically, the battle game execution unit 181a updates the raid HP of the sub-boss serving as an opponent on the basis of the received game result information. In addition, the reward granting unit 185a grants an item on the basis of the game result information.

Figure 16:
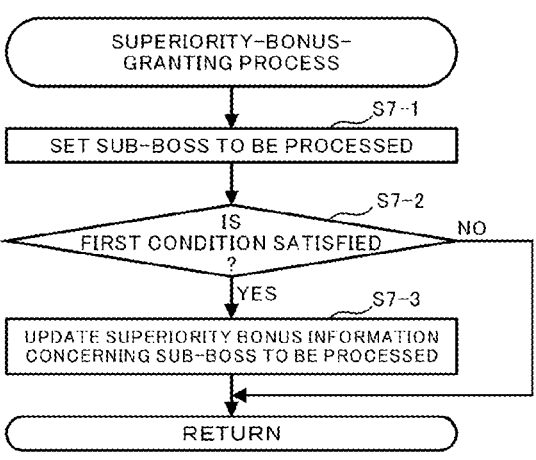
FIG. 16 is a flowchart for illustrating an example of a superiority-bonus-granting process in the server.

Next, the superiority bonus granting unit 186a of the server 100 executes a superiority-bonus-granting process on the basis of the received game result information. FIG. 16 is a flowchart for illustrating an example of the superiority-bonus-granting process in the server 100. The superiority bonus granting unit 186a of the server 100 sets a sub-boss to be processed on the basis of the received game result information (S7-1).

By referring to the bonus-granting-condition setting table shown in FIG. 8, the superiority bonus granting unit 186a of the server 100 determines whether or not a new first condition has been satisfied for the to-be-processed sub-boss that has been set in step S7-1 above (S7-2). If the result indicates that a new first condition has been satisfied, the flow proceeds to step S7-3. If the result indicates that no new first conditions are satisfied, the superiority-bonus-granting process ends.

The superiority bonus granting unit 186a of the server 100 updates the superiority bonus information concerning the sub-boss for whom a first condition has been satisfied on the basis of the bonus-granting-condition setting table shown in FIG. 8 (S7-3) and ends the superiority-bonus-granting process.

Figure 17:
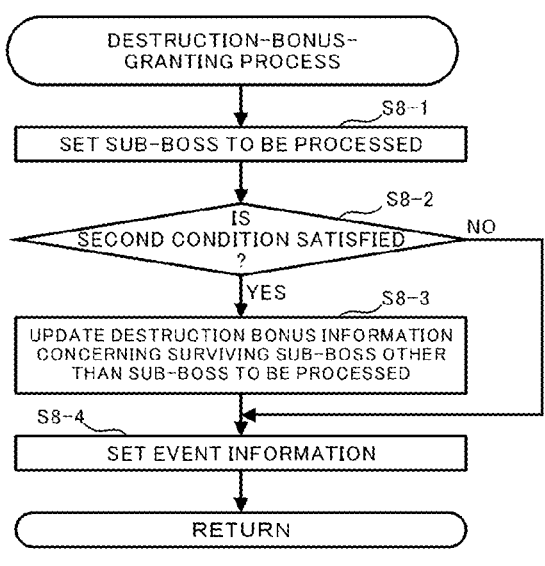
FIG. 17 is a flowchart for illustrating an example of a destruction-bonus-granting process in the server.

Referring back to FIG. 14, the destruction bonus granting unit 187a of the server 100 executes a destruction-bonus-granting process on the basis of the received game result information. FIG. 17 is a flowchart for illustrating an example of the destruction-bonus-granting process in the server 100. The destruction bonus granting unit 187a of the server 100 sets a sub-boss to be processed on the basis of the received game result information (S8-1).

By referring to the bonus-granting-condition setting table shown in FIG. 8, the destruction bonus granting unit 187a of the server 100 determines whether or not a new second condition has been satisfied for the to-be-processed sub-boss that has been set in step S8-1 above (S8-2). If the result indicates that a new second condition has been satisfied, the flow proceeds to step S8-3. If no new second conditions are satisfied, the flow proceeds to step S8-4.

On the basis of the bonus-granting-condition setting table shown in FIG. 8, the destruction bonus granting unit 187a of the server 100 updates destruction bonus information concerning a surviving (raid HP of larger than 0) sub-boss other than the sub-boss for whom the second condition has been satisfied (S8-3).

The destruction bonus granting unit 187a of the server 100 sets the event information saved in the game information storage section 190 so as to be acquirable by the player terminal 1, and then ends the destruction-bonus-granting process.

As described above, the player terminal 1 includes: the game execution control program 80; the battle game execution program 81; the player information saving program 82; the support character setting program 83; the party organization program 84; and the display control program 85. Also, the player terminal 1 functions as: the game execution control unit 80a; the battle game execution unit 81a; the player information saving unit 82a; the support character setting unit 83a; the party organization unit 84a; and the display control unit 85a. However, some or all of these programs and functional units may be provided in the server 100. In short, these programs and functional units may be provided in either or both of the player terminal 1 and the server 100.

Also, the server 100 includes: the game execution control program 180; the battle game execution program 181; the player information saving program 182; the support character information saving program 183; the party organization information saving program 184; the reward granting program 185; the superiority bonus granting program 186; the destruction bonus granting program 187; and the special effect character setting program 188. Furthermore, the server 100 functions as: the game execution control unit 180a; the battle game execution unit 181a; the player information saving unit 182a; the support character information saving unit 183a; the party organization information saving unit 184a; the reward granting unit 185a; the superiority bonus granting unit 186a; the destruction bonus granting unit 187a; and the special effect character setting unit 188a. However, some or all of these programs and functional units may be provided in the player terminal 1. In short, these programs and functional units may be provided in either or both of the player terminal 1 and the server 100.

Also, the aforementioned embodiment has been described by way of an example of a battle game in which all players stored in the server 100 combat against a powerful enemy character (sub-boss in this embodiment) in cooperation with one another in the event battle. Without limitation to this case, however, this disclosure may allow the event battle to be executed individually for each player.

The aforementioned embodiment has been described by way of an example where party organization in the event battle needs to include at least one of the ally characters possessed by the player himself/herself. Without limitation to this case, however, this disclosure may allow the player to organize all ally characters with support characters for party organization in the event battle.

Although an aspect of the embodiment has been described with reference to the accompanying drawings, it goes without saying that the present invention is not limited to the aforementioned embodiment. It would be obvious that a person skilled in the art could conceive of various modifications and amendments within the scope recited in the claims, and it will be understood that those modifications and amendments obviously belong to the technical scope of the present invention.

In the aforementioned embodiment, the division of roles for the processing executed in the player terminal 1 and the server 100 is merely an example. For example, it suffices if the aforementioned processing is executed by at least one of the player terminal 1 and the server 100. Also, the execution timing of the processing and the device for executing the processing are not particularly limited.

Furthermore, the processing in the player terminal 1 and the server 100 in the aforementioned embodiment is merely examples. It is needless to say that the processing in the player terminal 1 and the server 100 can be designed as appropriate without departing from the purpose of the present invention.

For example, processing related to a superiority bonus (first favorable condition) or a destruction bonus (second favorable condition) in the server 100 may be executed as follow. First, a decrement process (parameter update process) related to the raid HP of each of the sub-bosses is executed on the basis of game result information received from the player terminal 1 of each player. Then, it is determined whether or not a superiority bonus (first favorable condition) or the destruction bonus (second favorable condition) has occurred on the basis of the raid HP of each of the sub-bosses after the decrement process has been executed. Also, when a superiority bonus (first favorable condition) or the destruction bonus (second favorable condition) has occurred, information concerning the ID of the sub-boss for whom the superiority bonus (first favorable condition) or the destruction bonus (second favorable condition) has occurred, the ID of the superiority bonus (first favorable condition) or the destruction bonus (second favorable condition) that has occurred, and the time clock at which the superiority bonus (first favorable condition) or the destruction bonus (second favorable condition) has occurred is maintained as event information. Also, when the display is switched to the event battle screen, the player terminal 1 may acquire, from the server 100, a list of the time clocks at which superiority bonuses (first favorable conditions) have occurred for each of the sub-bosses, a list of the IDs of superiority bonuses that have occurred, and a list of the IDs of sub-bosses for whom vanishment conditions have been satisfied, so that the event battle screen may be displayed on the basis of this acquired information.

Also, in the same manner as when the display is switched to the event battle screen, when a sub-boss battle against each of the sub-bosses is started, the player terminal 1 may acquire, from the server 100, a list of the time clocks at which superiority bonuses (first favorable conditions) have occurred for each of the sub-bosses, a list of the IDs of superiority bonuses that have occurred, and a list of the IDs of sub-bosses for whom vanishment conditions have been satisfied.

Note that, in order to allow the types of occurring superiority bonuses (first favorable conditions) and destruction bonuses (second favorable conditions) to be identified by acquiring the IDs of the superiority bonuses that have occurred and the IDs of the sub-bosses for whom vanishment conditions have been satisfied, the types of superiority bonuses may be pre-stored so as to be mapped to the IDs of the superiority bonuses, and the types of destruction bonuses may be pre-stored so as to be mapped to the IDs of sub-bosses, at the player terminal 1.

Also, for example, an update operation section captioned "Update" may be provided on the event battle screen. In this case, as a result of the update operation section being operated (tapped), the same processing (communication between the player terminal 1 and the server 100) as when the display is switched to the event battle screen may be executed, thereby updating information concerning each bonus and raid HP.

Furthermore, the aforementioned embodiment has been described by way of an example where, in the case where the number of superiority bonuses granted in a sub-boss battle against one sub-boss exceeds the upper-limit number, a superiority bonus concerning a first condition that has been newly satisfied is not granted (invalidated) in the sub-boss battle against that sub-boss. This processing may be executed in such a way that, for example, the player terminal 1 receives, from the server 100, the time clocks of all superiority bonuses (first favorable conditions) that have occurred, regardless of whether they are valid or invalid, and it is determined whether or not each of the superiority bonuses (first favorable conditions) is valid or invalid at the player terminal 1. More specifically, firstly, it is determined at the player terminal 1 whether or not each of the superiority bonuses (first favorable conditions) was valid at the time it occurred by reproducing the state at the time clock at which each of the superiority bonuses (first favorable conditions) occurred, thereby narrowing down only superiority bonuses (first favorable conditions) that were valid at the time they occurred. Secondly, after those superiority bonuses (first favorable conditions) have been narrowed down, it is determined which superiority bonuses (first favorable conditions) are valid or invalid at the current time (current time clock) by comparing the superiority bonuses (first favorable conditions) that have been narrowed down against the current time clock. In this manner, two-step calculations may be executed. By doing so, it is not necessary to determine, at the server 100, whether a superiority bonus (first favorable condition) was valid or invalid at the time it occurred, thus making it possible to reduce the calculation load and the implementation load at the server 100.

Note that, instead of the aforementioned information concerning each of the time clocks, the time period that has elapsed from the start of the event battle holding period or the time period until the end of the event battle holding period may be used.

The information processing program for executing the processes in the aforementioned embodiment may be stored in a computer-readable non-transitory storage medium and provided as a non-transitory storage medium. Furthermore, a game terminal device or an information processing system including this storage medium may be provided. The aforementioned embodiment may also be an information processing method that realizes each function and the steps shown in the flowcharts.

What is claimed is:

1. A non-transitory computer readable medium storing a program causing a computer to perform a method comprising:

displaying, on a display device within a player terminal, an event battle screen for a computer game,
  wherein the event battle screen provides a first user interface for selecting one or more opponents from among a plurality of opponents to battle with a game character that is controlled by a player using an input unit within the player terminal;

receiving, from the input unit within the player terminal, a player input from the player for the computer game in response to displaying the event battle screen;

determining, based on the player input, a selection of a subset of opponents among the plurality of opponents that are displayed within the event battle screen to produce a plurality of selected opponents,
  wherein a first opponent among the plurality of selected opponents is provided with a first condition, and
  wherein a second opponent among the plurality of selected opponents is provided with a second condition; and

executing a battle within the computer game against the
plurality of selected opponents by the game character
that is controlled by the player,
wherein executing the battle within the computer game
comprises:
in response to determining that the first condition is
satisfied in the battle, granting a first bonus to the
game character in the battle against the first opponent
for whom the first condition has been satisfied;
in response to determining that the second condition is
satisfied in the battle, granting a second bonus to the
game character in the battle against a third opponent
among the plurality of opponents other than the
second opponent for whom the second condition has
been satisfied,
wherein the first bonus and the second bonus can be
granted simultaneously in the battle against one
opponent among the plurality of opponents; and
displaying, within one or more bonus confirmation
screens on the display device, a listing of the first
bonus and the second bonus that are granted in the
battle against the first opponent and the third oppo-
nent so as to be identifiable by the player during
execution of the battle within the computer game.
2. The non-transitory computer readable medium accord-
ing to claim 1,
wherein a respective parameter is set for each of the
plurality of selected opponents,
wherein the respective parameter of a selected opponent
among the plurality of selected opponents is changed
while executing the battle, and
wherein, while granting the first bonus, and in response to
the respective parameter of the selected opponent
reaching a predetermined value, the first bonus is
granted for a predetermined period of time by deter-
mining that the first condition has been satisfied.
3. The non-transitory computer readable medium accord-
ing to claim 2,
wherein a respective parameter is set for each of the
plurality of opponents,
wherein the respective parameter of a selected opponent
among the plurality of selected opponents is changed
while executing the battle, and
wherein, while granting the second bonus, and in response
to the respective parameter of the selected opponent
reaching a particular value, the second bonus is granted
by determining that the second condition has been
satisfied, and
wherein, while determining the selection of the subset of
opponents, the respective parameter of the selected
opponent is disabled of whom the selected opponent
has reached the particular value.
4. The non-transitory computer readable medium accord-
ing to claim 1,
wherein a respective parameter is set for each of the
plurality of opponents,
wherein the respective parameter of a selected opponent
among the plurality of selected opponents is changed
while executing the battle, and
wherein, while granting the second bonus, and in response
to the respective parameter of the selected opponent
reaching a particular value, the second bonus is granted
by determining that the second condition has been
satisfied, and
wherein, while determining the selection of the subset of
opponents, the respective parameter of the selected opponent is disabled of whom the selected opponent
has reached the particular value.
5. An information processing method comprising:
displaying, on a display device within a player terminal,
an event battle screen for a computer game,
wherein the event battle screen provides a first user
interface for selecting one or more opponents from
among a plurality of opponents to battle with a game
character that is controlled by a player using an input
unit within the player terminal;
receiving, from the input unit within the player terminal,
a player input from the player for the computer game in
response to displaying the event battle screen;
determining, based on the player input, a selection of a
subset of opponents among the plurality of opponents
that are displayed within the event battle screen to
produce a plurality of selected opponents,
wherein a first opponent among the plurality of selected
opponents is provided with a first condition, and
wherein a second opponent among the plurality of
selected opponents is provided with a second con-
dition; and
executing a battle within the computer game against the
plurality of selected opponents by the game character
that is controlled by the player,
wherein executing the battle within the computer game
comprises:
in response to determining that the first condition is
satisfied in the battle, granting a first bonus to the
game character in the battle against the first opponent
for whom the first condition has been satisfied;
in response to determining that the second condition is
satisfied in the battle, granting a second bonus to the
game character in the battle against a third opponent
among the plurality of opponents other than the
second opponent for whom the second condition has
been satisfied,
wherein the first bonus and the second bonus can be
granted simultaneously in the battle against one
opponent among the plurality of opponents; and
displaying, within one or more bonus confirmation
screens on the display device, a listing of the first bonus
and the second bonus that are granted in the battle
against the first opponent and the third opponent so as
to be identifiable by the player during execution of the
battle within the computer game.
6. An information processing system comprising:
a computer processor; and
a memory connected to the computer processor, wherein
the memory comprises a program configured to per-
form a method comprising:
displaying, on a display device within a player termi-
nal, an event battle screen for a computer game,
wherein the event battle screen provides a first user
interface for selecting one or more opponents from
among a plurality of opponents to battle with a game
character that is controlled by a player using an input
unit within the player terminal;
receiving, from the input unit within the player termi-
nal, a player input from the player for the computer
game in response to displaying the event battle
screen;
determining, based on the player input, a selection of a
subset of opponents among the plurality of oppo-
nents that are displayed within the event battle screen
to produce a plurality of selected opponents, wherein a first opponent among the plurality of selected opponents is provided with a first condition, and wherein a second opponent among the plurality of selected opponents is provided with a second condition; and executing a battle within the computer game against the plurality of selected opponents by the game character that is controlled by the player, wherein executing the battle within the computer game comprises:

in response to determining that the first condition is satisfied in the battle, granting a first bonus to the game character in the battle against the first opponent for whom the first condition has been satisfied;

in response to determining that the second condition is satisfied in the battle, granting a second bonus to the game character in the battle against a third opponent among the plurality of opponents other than the second opponent for whom the second condition has been satisfied, wherein the first bonus and the second bonus can be granted simultaneously in the battle against one opponent among the plurality of opponents; and displaying, within one or more bonus confirmation screens on the display device, a listing of the first bonus and the second bonus that are granted in the battle against the first opponent and the third opponent so as to be identifiable by the player during execution of the battle within the computer game.

\* \* \* \* \*